US012683665B2

(12) United States Patent
Landis et al.

(10) Patent No.: US 12,683,665 B2
(45) Date of Patent: Jul. 14, 2026

(54) POWER AMPLIFIER COMPRESSED REFERENCE SIGNALS FOR DIGITAL POST DISTORTION DETECTION

(71) Applicant: QUALCOMM INCORPORATED, San Diego, CA (US)

(72) Inventors: Shay Landis, Hod Hasharon (IL); Gideon Shlomo Kutz, Ramat Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 18/701,907

(22) PCT Filed: Oct. 27, 2022

(86) PCT No.: PCT/US2022/078799
§ 371 (c)(1),
(2) Date: Apr. 16, 2024

(87) PCT Pub. No.: WO2023/107786
PCT Pub. Date: Jun. 15, 2023

(65) Prior Publication Data
US 2025/0226864 A1     Jul. 10, 2025

(30) Foreign Application Priority Data

Dec. 10, 2021     (IL) ......................................... 288885

(51) Int. Cl.
*H04B 7/06*          (2006.01)
*H04B 1/04*          (2006.01)
(Continued)

(52) U.S. Cl.
CPC ......... *H04B 7/0626* (2013.01); *H04B 1/0475* (2013.01); *H04B 7/0465* (2013.01);
(Continued)

(58) Field of Classification Search
CPC .. H04B 7/0626; H04B 7/0465; H04B 7/0632; H04B 7/0636; H04B 7/0639;
(Continued)

(56) References Cited

U.S. PATENT DOCUMENTS 5,731,993 A * 3/1998 Wachs ................. H04B 17/309
                                                           702/90
8,000,663 B2 * 8/2011 Flowers .................... H03F 3/24
                                                           455/127.1
(Continued)

FOREIGN PATENT DOCUMENTS

KR       20160082457 A *  7/2016  ............. H03F 3/245
WO       WO-2019190551 A1   10/2019

OTHER PUBLICATIONS

International Search Report and Written Opinion—PCT/US2022/078799—ISA/EPO—Apr. 17, 2023.
(Continued)

*Primary Examiner* — Joshua Kading
(74) *Attorney, Agent, or Firm* — Holland & Hart LLP

(57) ABSTRACT

Methods, systems, and devices for wireless communications are described. The method includes transmitting a set of reference signals to a user equipment (UE), where the set of reference signals include a power amplifier uncompressed reference signal and a subset of compressed reference signals that are compressed with respective levels of power amplifier compression, receiving a channel state report from the UE that includes channel state feedback associated with the power amplifier uncompressed reference signal and each reference signal of the subset of compressed reference signals based at least in part on the UE performing a channel state measurement on each reference signal of the set of reference signals, selecting a power amplifier compression level for communications with the UE based at least in part
(Continued)

on the channel state report, and communicating with the UE according to the selected power amplifier compression level.

30 Claims, 16 Drawing Sheets

(51) Int. Cl.
| | |
|---|---|
| *H04B 7/0456* | (2017.01) |
| *H04B 17/13* | (2015.01) |
| *H04W 52/18* | (2009.01) |
| *H04W 52/52* | (2009.01) |

(52) U.S. Cl.
CPC ......... *H04B 7/0632* (2013.01); *H04B 7/0636* (2013.01); *H04B 17/13* (2015.01); *H04W 52/18* (2013.01); *H04W 52/52* (2013.01); *H04B 2001/0408* (2013.01); *H04B 2001/0416* (2013.01)

(58) Field of Classification Search
CPC .... H04B 1/0475; H04B 17/13; H04B 17/318; H04B 17/328; H04B 2001/0408; H04B 2001/0416; H04W 52/18; H04W 52/52
See application file for complete search history.

(56) References Cited

U.S. PATENT DOCUMENTS

| | | | | |
|---|---|---|---|---|
| 11,683,706 | B2 * | 6/2023 | Barak ................. | H04B 17/104 |
| | | | | 370/252 |
| 2009/0285329 | A1 * | 11/2009 | Matsuoka ............... | H03F 3/245 |
| | | | | 455/127.1 |
| 2015/0126142 | A1 * | 5/2015 | Meredith ............. | H04W 52/04 |
| | | | | 455/127.2 |
| 2019/0190552 | A1 | 6/2019 | Sagi et al. | |
| 2019/0222326 | A1 * | 7/2019 | Dunworth ............. | H04B 17/13 |
| 2022/0312244 | A1 * | 9/2022 | Landis ................. | H04W 24/10 |

OTHER PUBLICATIONS

Partial International Search Report—PCT/US2022/078799—ISA/EPO—Feb. 15, 2023.
Partial International Search Report—PCT/US2022/078799—ISA/EPO—Feb. 23, 2023.

* cited by examiner

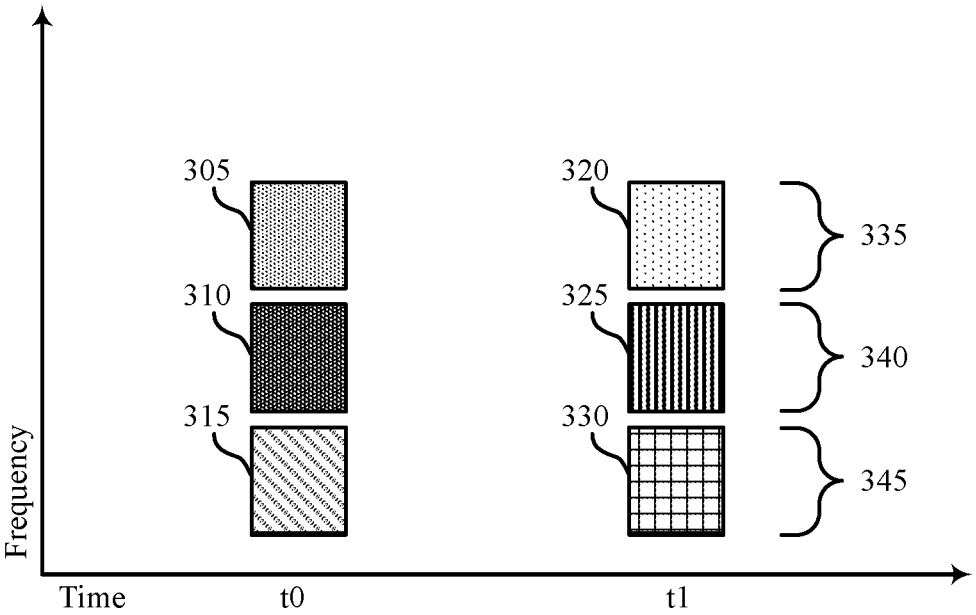
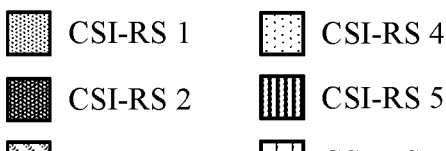
FIG. 3

115-b 105-b

←——————Set of reference signals——————

405

410 — Perform channel state measurements

415

——————Channel state report——————→

Analyze channel state report

420

Select power amplifier compression level

425

←——————Communicate——————→

430

400

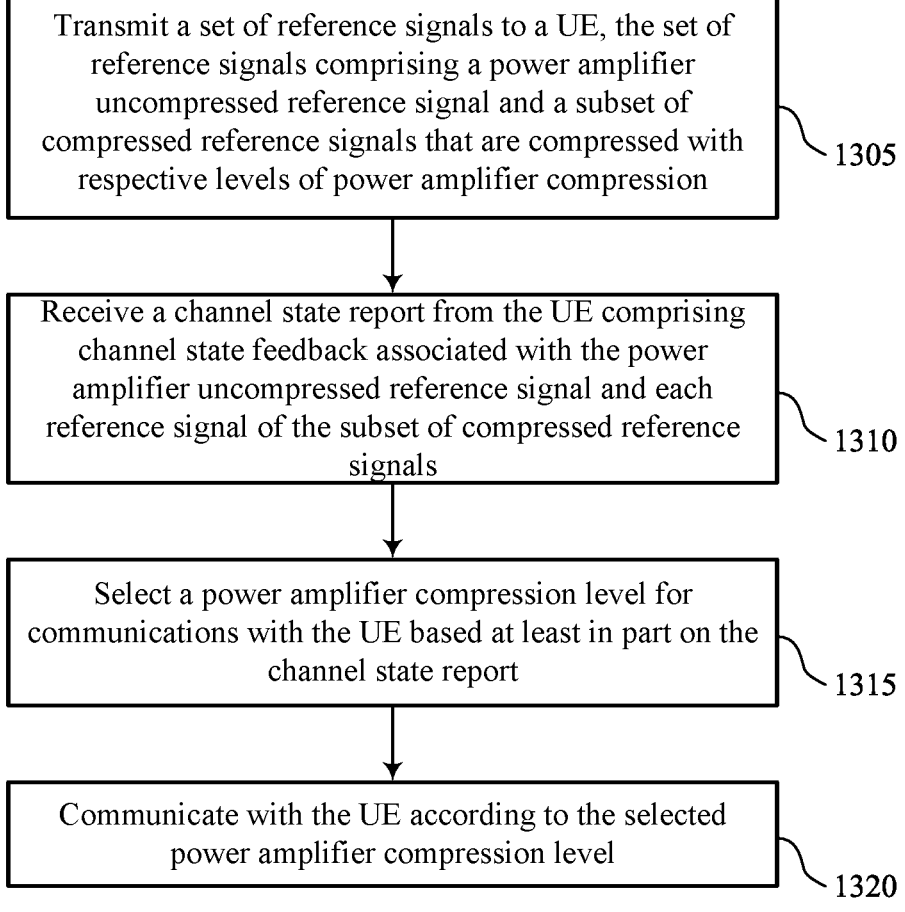

Transmit a set of reference signals to a UE, the set of reference signals comprising a power amplifier uncompressed reference signal and a subset of compressed reference signals that are compressed with respective levels of power amplifier compression

1305

Receive a channel state report from the UE comprising channel state feedback associated with the power amplifier uncompressed reference signal and each reference signal of the subset of compressed reference signals

1310

Select a power amplifier compression level for communications with the UE based at least in part on the channel state report

1315

Communicate with the UE according to the selected power amplifier compression level

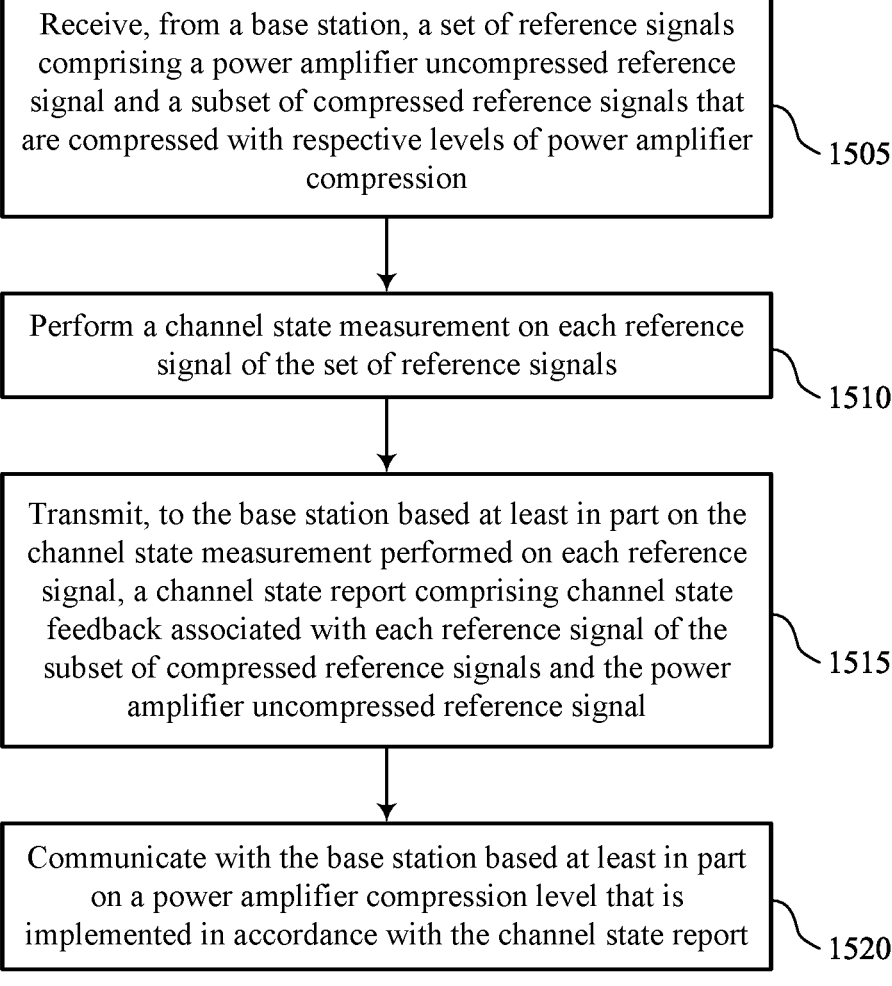

Receive, from a base station, a set of reference signals comprising a power amplifier uncompressed reference signal and a subset of compressed reference signals that are compressed with respective levels of power amplifier compression

1505

Perform a channel state measurement on each reference signal of the set of reference signals

1510

Transmit, to the base station based at least in part on the channel state measurement performed on each reference signal, a channel state report comprising channel state feedback associated with each reference signal of the subset of compressed reference signals and the power amplifier uncompressed reference signal

1515

Communicate with the base station based at least in part on a power amplifier compression level that is implemented in accordance with the channel state report

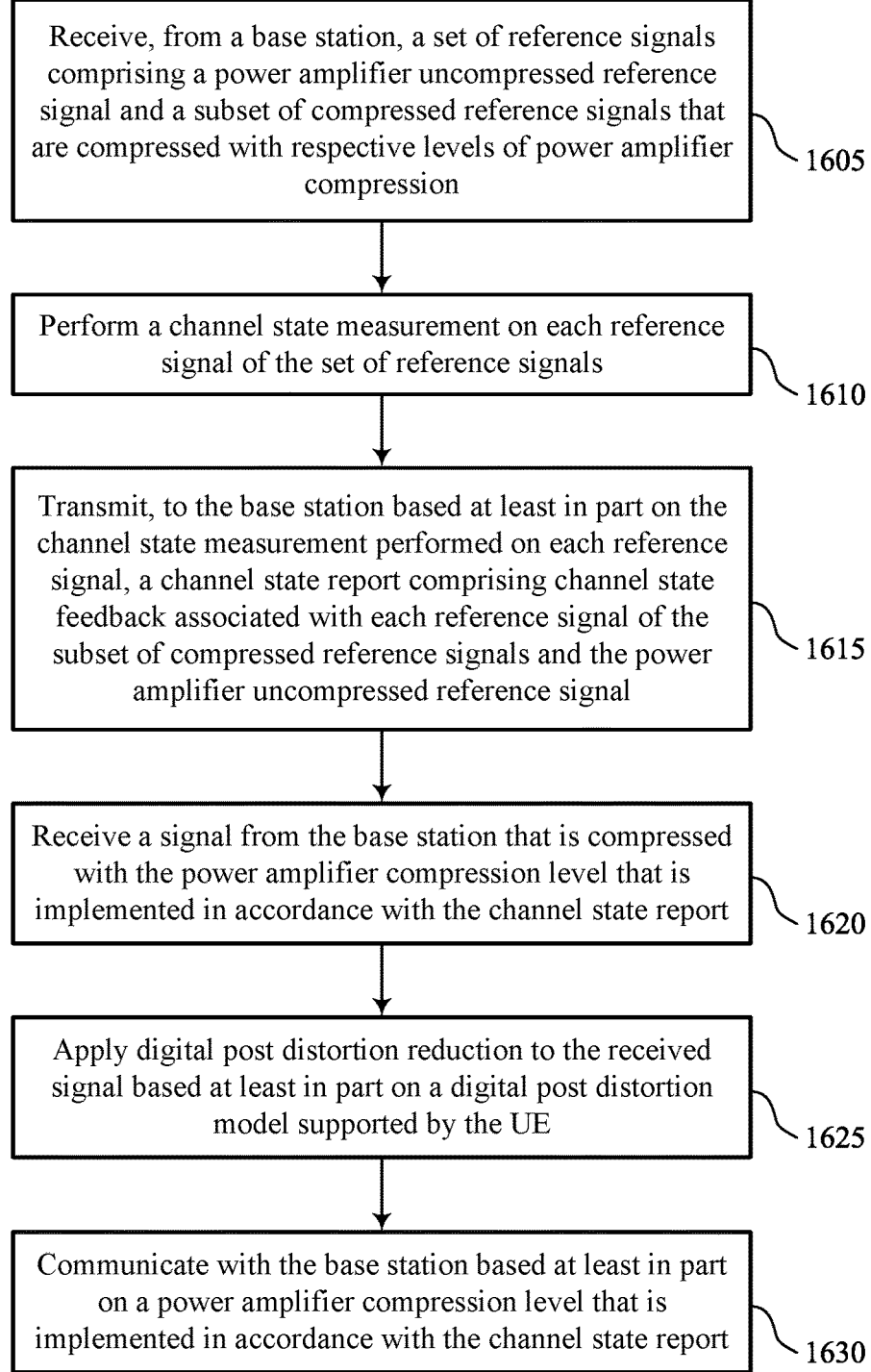

Receive, from a base station, a set of reference signals comprising a power amplifier uncompressed reference signal and a subset of compressed reference signals that are compressed with respective levels of power amplifier compression

1605

Perform a channel state measurement on each reference signal of the set of reference signals

1610

Transmit, to the base station based at least in part on the channel state measurement performed on each reference signal, a channel state report comprising channel state feedback associated with each reference signal of the subset of compressed reference signals and the power amplifier uncompressed reference signal

1615

Receive a signal from the base station that is compressed with the power amplifier compression level that is implemented in accordance with the channel state report

1620

Apply digital post distortion reduction to the received signal based at least in part on a digital post distortion model supported by the UE

1625

Communicate with the base station based at least in part on a power amplifier compression level that is implemented in accordance with the channel state report

POWER AMPLIFIER COMPRESSED REFERENCE SIGNALS FOR DIGITAL POST DISTORTION DETECTION

CROSS REFERENCES

The present Application is a 371 national stage filing of International PCT Application No. PCT/US2022/078799 by LANDIS et al. entitled "POWER AMPLIFIER COMPRESSED REFERENCE SIGNALS FOR DIGITAL POST DISTORTION DETECTION," filed Oct. 27, 2022; and claims priority to Israel Patent Application No. 288885 by LANDIS et al. entitled "POWER AMPLIFIER COMPRESSED REFERENCE SIGNALS FOR DIGITAL POST DISTORTION DETECTION," filed Dec. 10, 2021, each of which is assigned to the assignee hereof, and each of which is expressly incorporated by reference in its entirety herein.

FIELD OF TECHNOLOGY

The following relates to wireless communications, including power amplifier compressed reference signals for digital post distortion detection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support compressed reference signals for digital post distortion detection. In some cases, it may be desirable to improve wireless communications associated with digital post distortion detection.

SUMMARY

The described techniques relate to improved methods, systems, devices, and apparatuses that support power amplifier compressed reference signals for digital post distortion detection. Generally, the described techniques provide for a base station transmitting a set of reference signals to a user equipment (UE), receiving a channel state report from the UE, selecting a power amplifier compression level for communications with the UE based on the channel state report, and communicating with the UE according to the selected power amplifier compression level. In some cases, the set of reference signals may include a power amplifier uncompressed reference signal and a subset of compressed reference signals that are compressed with respective levels of power amplifier compression. In some cases, the channel state report may include channel state feedback associated with the power amplifier uncompressed reference signal and each reference signal of the subset of compressed reference signals.

A method for wireless communication at a base station is described. The method may include transmitting a set of reference signals to a user equipment (UE), the set of reference signals comprising a power amplifier uncompressed reference signal and a subset of compressed reference signals that are compressed with respective levels of power amplifier compression, receiving a channel state report from the UE comprising channel state feedback associated with the power amplifier uncompressed reference signal and each reference signal of the subset of compressed reference signals, selecting a power amplifier compression level for communications with the UE based at least in part on the channel state report, and communicating with the UE according to the selected power amplifier compression level.

An apparatus for wireless communication at a base station is described. The apparatus may include a processor, memory coupled with the processor, and instructions stored in the memory. The instructions may be executable by the processor to cause the apparatus to transmit a set of reference signals to a UE, the set of reference signals comprising a power amplifier uncompressed reference signal and a subset of compressed reference signals that are compressed with respective levels of power amplifier compression, receive a channel state report from the UE comprising channel state feedback associated with the power amplifier uncompressed reference signal and each reference signal of the subset of compressed reference signals, select a power amplifier compression level for communications with the UE based at least in part on the channel state report, and communicate with the UE according to the selected power amplifier compression level.

Another apparatus for wireless communication at a base station is described. The apparatus may include means for transmitting a set of reference signals to a UE, the set of reference signals comprising a power amplifier uncompressed reference signal and a subset of compressed reference signals that are compressed with respective levels of power amplifier compression, means for receiving a channel state report from the UE comprising channel state feedback associated with the power amplifier uncompressed reference signal and each reference signal of the subset of compressed reference signals, means for selecting a power amplifier compression level for communications with the UE based at least in part on the channel state report, and means for communicating with the UE according to the selected power amplifier compression level.

A non-transitory computer-readable medium storing code for wireless communication at a base station is described. The code may include instructions executable by a processor to transmit a set of reference signals to a UE, the set of reference signals comprising a power amplifier uncompressed reference signal and a subset of compressed reference signals that are compressed with respective levels of power amplifier compression, receive a channel state report from the UE comprising channel state feedback associated with the power amplifier uncompressed reference signal and each reference signal of the subset of compressed reference signals, select a power amplifier compression level for communications with the UE based at least in part on the channel state report, and communicate with the UE according to the selected power amplifier compression level.

Some examples of the method, apparatuses, and non-transitory computer-readable medium described herein may further include operations, features, means, or instructions for comparing channel state feedback of at least one reference signal of the subset of compressed reference signals to channel state feedback of the power amplifier uncompressed reference signal and determining, based at least in part on a result of the comparing, a highest level of power amplifier compression that the UE may be capable of processing of the respective levels of power amplifier compression.

In some examples of the method, apparatuses, and non-transitory computer-readable medium described herein, determining the highest level of power amplifier compression that the UE may be capable of processing may include operations, features, means, or instructions for determining that the UE may be capable of processing channel state feedback of a first reference signal of the subset of compressed reference signals associated with a first level of power amplifier compression, determining that the UE may be not capable of processing channel state feedback of a second reference signal of the subset of compressed reference signals associated with a second level of power amplifier compression, and selecting the first level of power amplifier compression as the highest level of power amplifier compression that the UE may be capable of processing of the respective levels of power amplifier compression.

In some examples of the method, apparatuses, and non-transitory computer-readable medium described herein, the second level of power amplifier compression may be a next highest level of power amplifier compression above the first level of power amplifier compression of the respective levels of power amplifier compression.

In some examples of the method, apparatuses, and non-transitory computer-readable medium described herein, the highest level of power amplifier compression that the UE may be capable of processing may be based at least in part on a coefficient of a digital post distortion model supported by the UE.

In some examples of the method, apparatuses, and non-transitory computer-readable medium described herein, the selected power amplifier compression level may be selected from the respective levels of power amplifier compression of the subset of compressed reference signals.

In some examples of the method, apparatuses, and non-transitory computer-readable medium described herein, the channel state feedback comprises a pre-coding matrix indicator, a channel quality indicator, or a rank indicator, or any combination thereof.

In some examples of the method, apparatuses, and non-transitory computer-readable medium described herein, the set of reference signals comprise channel state information reference signals.

In some examples of the method, apparatuses, and non-transitory computer-readable medium described herein, the set of reference signals to may be transmitted periodically or aperiodically.

In some examples of the method, apparatuses, and non-transitory computer-readable medium described herein, the power amplifier uncompressed reference signal may be transmitted by a transmitter of the base station while a power amplifier of the transmitter may be operating in a linear region.

In some examples of the method, apparatuses, and non-transitory computer-readable medium described herein, the subset of compressed reference signals may be transmitted by a transmitter of the base station while a power amplifier of the transmitter may be operating in a compression region.

A method for wireless communication at a UE is described. The method may include receiving, from a base station, a set of reference signals comprising a power amplifier uncompressed reference signal and a subset of compressed reference signals that are compressed with respective levels of power amplifier compression, performing a channel state measurement on each reference signal of the set of reference signals, transmitting, to the base station based at least in part on the channel state measurement performed on each reference signal, a channel state report comprising channel state feedback associated with each reference signal of the subset of compressed reference signals and the power amplifier uncompressed reference signal, and communicating with the base station based at least in part on a power amplifier compression level that is implemented in accordance with the channel state report.

An apparatus for wireless communication at a UE is described. The apparatus may include a processor, memory coupled with the processor, and instructions stored in the memory. The instructions may be executable by the processor to cause the apparatus to receive, from a base station, a set of reference signals comprising a power amplifier uncompressed reference signal and a subset of compressed reference signals that are compressed with respective levels of power amplifier compression, perform a channel state measurement on each reference signal of the set of reference signals, transmit, to the base station based at least in part on the channel state measurement performed on each reference signal, a channel state report comprising channel state feedback associated with each reference signal of the subset of compressed reference signals and the power amplifier uncompressed reference signal, and communicate with the base station based at least in part on a power amplifier compression level that is implemented in accordance with the channel state report.

Another apparatus for wireless communication at a UE is described. The apparatus may include means for receiving, from a base station, a set of reference signals comprising a power amplifier uncompressed reference signal and a subset of compressed reference signals that are compressed with respective levels of power amplifier compression, means for performing a channel state measurement on each reference signal of the set of reference signals, means for transmitting, to the base station based at least in part on the channel state measurement performed on each reference signal, a channel state report comprising channel state feedback associated with each reference signal of the subset of compressed reference signals and the power amplifier uncompressed reference signal, and means for communicating with the base station based at least in part on a power amplifier compression level that is implemented in accordance with the channel state report.

A non-transitory computer-readable medium storing code for wireless communication at a UE is described. The code may include instructions executable by a processor to receive, from a base station, a set of reference signals comprising a power amplifier uncompressed reference signal and a subset of compressed reference signals that are compressed with respective levels of power amplifier compression, perform a channel state measurement on each reference signal of the set of reference signals, transmit, to the base station based at least in part on the channel state measurement performed on each reference signal, a channel state report comprising channel state feedback associated with each reference signal of the subset of compressed reference signals and the power amplifier uncompressed reference signal, and communicate with the base station based at least in part on a power amplifier compression level that is implemented in accordance with the channel state report.

In some examples of the method, apparatuses, and non-transitory computer-readable medium described herein, performing the channel state measurement on each reference signal of the set of reference signals may include operations, features, means, or instructions for estimating the channel state feedback of each reference signal of the set of reference signals, the channel state feedback comprising a pre-coding matrix indicator, a channel quality indicator, a rank indicator, or a modulation and coding scheme value, or any combination thereof.

In some examples of the method, apparatuses, and non-transitory computer-readable medium described herein, communicating with the base station may include operations, features, means, or instructions for receiving a signal from the base station that may be compressed with the power amplifier compression level that may be implemented in accordance with the channel state report and applying digital post distortion reduction to the received signal based at least in part on a digital post distortion model supported by the UE.

Some examples of the method, apparatuses, and non-transitory computer-readable medium described herein may further include operations, features, means, or instructions for applying digital post distortion reduction may be based at least in part on coefficients of the digital post distortion model that may be supported by the UE.

In some examples of the method, apparatuses, and non-transitory computer-readable medium described herein, the power amplifier compression level that may be implemented in accordance with the channel state report may be based at least in part on the coefficients of the digital post distortion model, the coefficients comprising one or more weights of a Volterra filter.

In some examples of the method, apparatuses, and non-transitory computer-readable medium described herein, the set of reference signals may be received periodically or aperiodically.

In some examples of the method, apparatuses, and non-transitory computer-readable medium described herein, transmission of the power amplifier uncompressed reference signal may be based at least in part on a power amplifier of the base station operating in a linear region.

In some examples of the method, apparatuses, and non-transitory computer-readable medium described herein, transmission of the subset of compressed reference signals may be based at least in part on a power amplifier of the base station operating in a compression region.

BRIEF DESCRIPTION OF THE DRAWINGS

FIG. 3 illustrates an example of a set of reference signals that supports power amplifier compressed reference signals for digital post distortion detection in accordance with aspects of the present disclosure.

FIGS. 13 through 16 show flowcharts illustrating methods that support power amplifier compressed reference signals for digital post distortion detection in accordance with aspects of the present disclosure.

DETAILED DESCRIPTION

Figure 1:
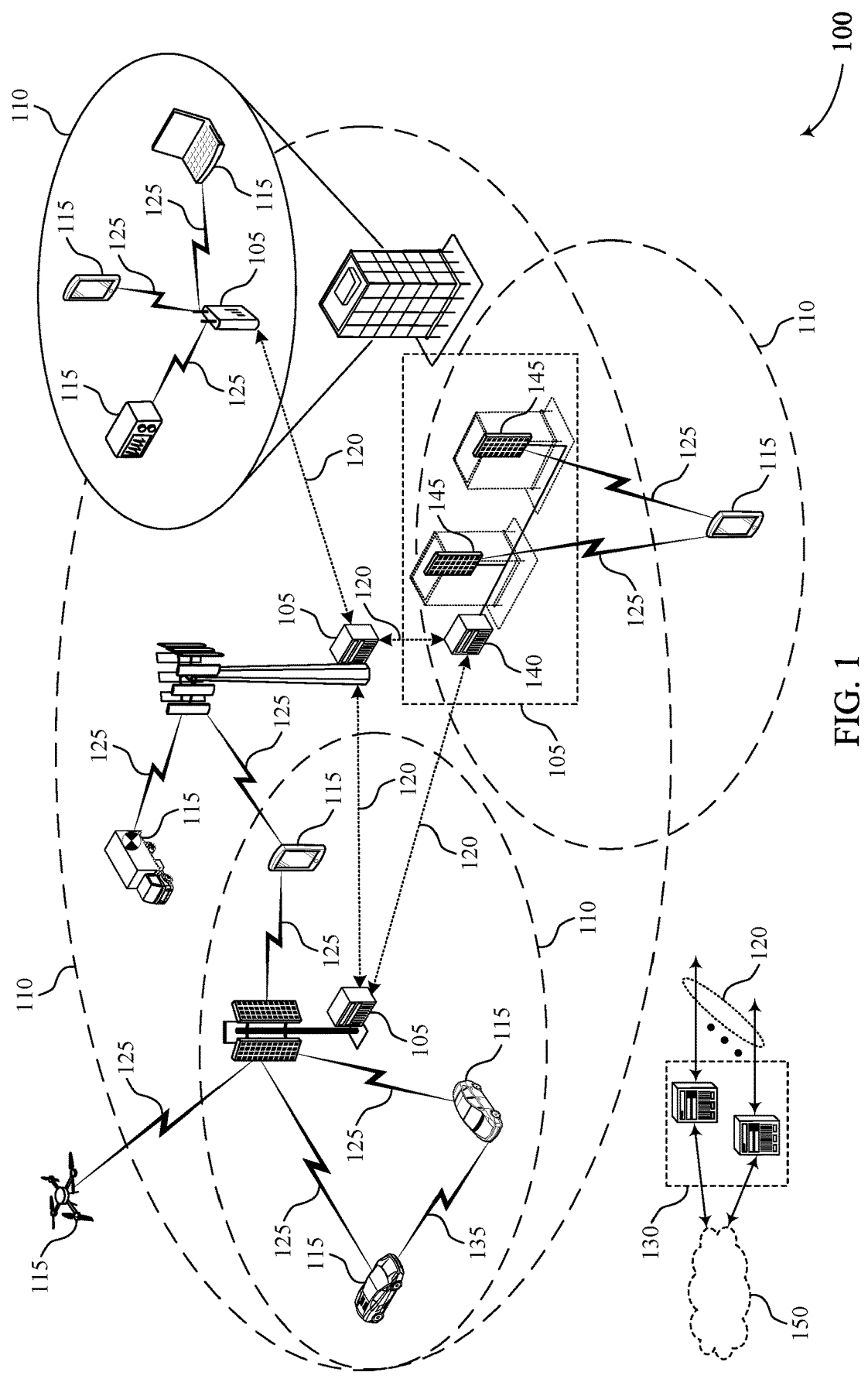
FIG. 1 illustrates an example of a wireless communications system that supports power amplifier compressed reference signals for digital post distortion detection in accordance with aspects of the present disclosure.

The present techniques include compressed reference signals for digital post distortion detection (e.g., reference signals transmitted when a power amplifier (PA) is operating at a level of compression). At a lower range of input power an output of a PA may be linear with the input power. Compression (e.g., gain compression) occurs when the input power of the PA is increased to a level that reduces the gain of the PA (e.g., ratio of output power to input power) and causes a nonlinear increase in the PA's output power that falls below the linear rate of increase of the linear gain region at the lower range of input power. Thus, as the input power increases in the compression region, the rate of PA gain decreases (e.g., the gain is compressed).

In some examples, a transmitter of a wireless device (e.g., a user equipment (UE) or base station) may transmit a transmit signal to one or more other wireless devices. However, as the transmission power of the transmitter increases the non-linearity of the transmit signals may increase. Some wireless systems may implement wideband signals because wideband signals may be spectrally more efficient than some other signals. However, wideband signals may be applied by PAs, which may be operated in nonlinear compression regions. The nonlinearity of PAs may generate spectral re-growth, which leads to adjacent channel interference and violations of out-of-band emission constraints set by regulatory bodies. The nonlinearity of PAs also causes in-band distortion, which degrades the bit error rate (BER) performance.

In some examples, PA non-linearity response estimation may distort a transmitted signal due to a high peak to average power ratio (PAPR). In some cases, the nonlinear distortions may be classified as in-band distortion, which affects link performance in the sense of mutual information (MI) or error vector magnitude (EVM), or both, as well as out-band distortion, which may dictate the amount of adjacent channel interference (ACI) that may be tolerated by a given system, where the ACI indicates how much an adjacent channel is polluted or distorted by a main channel transmission. In some cases, a high-power amplifier (HPA) may have a limited dynamic range (DR) that distorts the transmitted signal as a result of a relatively higher peak to average power ratio. The non-linear distortion may be an in-band distortion, which affects link performance in connection with an error vector magnitude (EVM) amount, or out-band distortion, which causes adjacent channel interference (e.g., the transmitted signal interferes with other signals on neighboring frequency bands).

To reduce PA nonlinearity and avoid interference and distortion, the PA of some systems may be operated at a lower power (backed off) so that the PA operates within the linear portion of its operating curve. However, as power back-off increases, power efficiency decreases, resulting in less power being transmitted to the channel, thereby reducing range, signal to interference noise ratio, etc.

In some examples, digital pre-distortion (DPD) may be used in a transmitter's digital front end (DFE) to complement power back-off. PA non-linearity response estimation may be based on DPD (e.g., at a base station or UE). In some cases, the transmitter may apply DPD processing to reduce non-linear distortion below a threshold level while operating at a reduced level of power back-off, resulting in an increase of power efficiency compared to power back-off without DPD processing. Although DPD processing may correct in-dynamic-range non-linearity, PA non-linearity may still cause a clipping effect (e.g., based on a relatively high peak to average power ratio resulting from the limited dynamic range of high-power amplifiers), thus limiting the power efficiency benefits of DPD processing.

In some examples, a Volterra filter may be used with digital post distortion (DPOD) processing to cancel nonlinear and linear interference. A Volterra series is a model for non-linear behavior similar to a Taylor series, but differing from the Taylor series in its ability to capture memory effects. While the Taylor series may be used for approximating the response of a nonlinear system to a given input at a particular time, the Volterra series may be used for approximating the response of a nonlinear system at all other times. Thus, the Volterra series provides the ability to capture the memory effect of devices like capacitors and inductors. In some cases, transmit I-Q baseband samples may be inputted into a non-linear state generator of a Volterra filter. Next, the Volterra filter may output a weighted sum of the Volterra states weighted by kernels or coefficients (e.g., weights w). In some cases, a weight estimation unit of a UE or a base station, or both, may calculate the kernels (e.g., coefficients of a digital post-distortion model, coefficients of digital post-distortion algorithms). In some cases, an error signal may be generated by subtracting the Volterra filter output from a composite observation signal (e.g., y(k), Y_k) on the receiver path, which includes the desired received signal plus the distortion. In some cases, feedback (e.g., residual error post cancellation feedback fed back to the weight estimation unit) may be used to iteratively adapt the kernels of the Volterra filter using a recursive algorithm for mean squared error (MSE) minimization. Examples of the recursive algorithm may include a least mean square (LMS) algorithm (e.g., LMS filter) or a recursive least squares (RLS) algorithm (e.g., RLS filter).

To remedy the limitations of DPD processing, the receiver of a wireless device may implement digital post distortion (DPOD) processing. However, in some systems a base station may not be configured to determine whether a UE is capable of DPOD processing. The present techniques enable a base station to determine whether a UE is capable of DPOD processing.

In some examples, a base station may determine whether a UE is capable of DPOD processing based on reference signals (e.g., channel state information reference signals (CSI-RS)). The present techniques may include a base station transmitting multiple DPOD reference signals (DPOD-RS) to the UE to determine whether a UE is capable of DPOD processing. In some cases, the DPOD-RS may be configured to be transmitted periodically or aperiodically.

In some examples, the base station may configure a set of DPOD-RSs for a given channel. In some cases, the base station may configure a DPOD-RS based on a CSI-RS. In some cases, the base station configures each DPOD-RS in a set of DPOD-RSs with a different level of PA compression (e.g., including no compression, or compression level 0). In some cases, a first DPOD-RS may include a first CSI-RS configured with a first level of PA compression, a second DPOD-RS may include a second CSI-RS configured with a second level of PA compression that is different than the first level of PA compression, and so forth. In some cases, a set of DPOD-RSs may include at least one CSI-RS with PA compression and at least one CSI-RS with no PA compression.

In some examples, a UE (e.g., a UE capable of DPOD processing) may receive a set of DPOD-RSs of different levels of compression and attempt to process each DPOD-RS. In some cases, the UE may process each DPOD-RS (e.g., that the UE is capable of processing). In some cases, the UE may be configured to process some levels of power amplifier compression, but not all levels of power amplifier compression associated with the set of DPOD-RSs. Thus, the UE may be configured to process some of the set of DPOD-RSs. In some cases, the level of compression that the UE is capable of handling may be based on the highest level of compression of the set of DPOD-RSs that the UE is capable of processing. In some cases, the level of compression that the UE is capable of handling may be based on the kernels (e.g., coefficients of a DPOD model, weights of a Volterra filter) that the UE supports. In some cases, a UE not capable of DPOD processing may interpret a DPOD-RS with PA compression as signal degradation in relation to a DPOD-RS without PA compression (e.g., uncompressed CSI-RS).

A UE may report channel state information for a given channel based on one or more reference signals (e.g., DPOD-RS, compressed CSI-RS) that the UE receives from the base station over the given channel. The channel state information may include a pre-coding matrix indicator (PMI), or a channel quality indicator (CQI), or a rank indicator (RI), or a modulation and coding scheme (MCS) value (e.g., based on the CQI), or any combination thereof. In some cases, the CQI may indicate channel quality according to a CQI index (e.g., a scalar value from 0 to 15). In some cases, the CQI index may indicate (e.g., map to) the highest modulation and coding scheme (MCS) value suitable for the downlink transmission to achieve the required block error rate (BLER) for given channel conditions.

Based on the present techniques, the UE may transmit a channel state report to the base station, where analysis of the channel state report by the base station indicates the level of compression (e.g., highest level of compression) that the UE is capable of handling (e.g., according to the kernels the UE supports). In some cases, a base station may analyze the channel state report and determine a PA compression (e.g., ideal PA compression) to implement based on the analysis of the channel state report. In some cases, the analysis of the channel state report may include the base station determining a level of PA efficiency (e.g., a level of power savings) associated with each compression level that the UE is capable of supporting. In some cases, the base station may select the compression level that provides the highest level of PA efficiency (e.g., highest level of power savings). In some cases, the highest compression level supported by the UE may provide the highest level of PA efficiency.

In some cases, a base station may send a first DPOD-RS with level-0 PA compression (e.g., no PA compression), a second DPOD-RS with level-1 PA compression (e.g., a first level of PA compression), a third DPOD-RS with level-2 PA compression that is a higher compression than level-1 PA compression, and a fourth DPOD-RS with level-3 PA compression that is a higher compression than level-2 PA compression. The UE may receive each DPOD-RS and perform channel state measurements (e.g., PMI, CQI, RI, or MCS, or a combination thereof) in relation to each DPOD-RS. In some cases, the UE may be configured with kernels (e.g., coefficients of a DPOD model, weights of a Volterra filter) for processing varying levels of PA compression.

In some cases, the UE may attempt to process the second DPOD-RS, third DPOD-RS, and fourth DPOD-RS. In some cases, the UE may successfully process the second DPOD-RS and third DPOD-RS (e.g., based on the kernels configured on the UE), but fail to correctly process the fourth DPOD-RS. In some cases, the UE may interpret the PA compression of the fourth DPOD-RS as noise or signal degradation (e.g., based on the UE's inability to process the PA compression of the fourth DPOD-RS). The UE may generate a channel state report based on the channel state measurements of the first DPOD-RS, the second DPOD-RS, the third DPOD-RS, and the fourth DPOD-RS. In some cases, the base station may determine that the UE is capable of processing up to level-2 PA compression, but not configured to process the level-3 PA compression based on the channel state report of the fourth DPOD-RS (e.g., based on the channel state report of the fourth DPOD-RS indicating the UE interpreted the level-3 PA compression as noise). Accordingly, the base station may select the level-2 PA compression and communicate with the UE based on the selected level-2 PA compression.

Aspects of the subject matter described herein may be implemented to realize one or more advantages. The described techniques may support improvements in system efficiency such that a device may use power amplifier compressed reference signals to detect digital post distortion capabilities and determine an extent of the digital post distortion capabilities. The described techniques may result in increased power amplifier efficiency, increased power savings, and increased battery life. The wireless communications system 200 may also support increased power efficiency, increased spectral efficiency, higher data rates and, in some examples, may promote enhanced efficiency for higher reliability and lower latency wireless communications (e.g., uplink transmission, downlink transmission, uplink reception, and downlink reception), among other benefits.

Aspects of the disclosure are initially described in the context of wireless communications systems. Aspects of the disclosure are further illustrated by and described with reference to block diagrams and process flows that relate to compressed reference signals for digital post distortion detection. Aspects of the disclosure are further illustrated by and described with reference to apparatus diagrams, system diagrams, and flowcharts that relate to compressed reference signals for digital post distortion detection.

FIG. 1 illustrates an example of a wireless communications system 100 that supports power amplifier compressed reference signals for digital post distortion detection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may transmit a set of reference signals to a UE 115. In some cases, the set of reference signals may include a power amplifier uncompressed reference signal and a subset of compressed reference signals that are compressed with respective levels of power amplifier compression. In some cases, the UE 115 may perform a channel state measurement on each reference signal of the set of reference signals. In some cases, the base station 105 may receive a channel state report from the UE 115. The channel state report may include channel state feedback associated with the power amplifier uncompressed reference signal and each reference signal of the subset of compressed reference signals based on the channel state measurements performed by the UE 115 on each reference signal of the set of reference signals. In some cases, the base station 105 may select a power amplifier compression level for communications with the UE 115 based on the channel state report. In some cases, the base station 105 may communicate with the UE 115 according to the power amplifier compression level selected by the base station 105.

Figure 2:
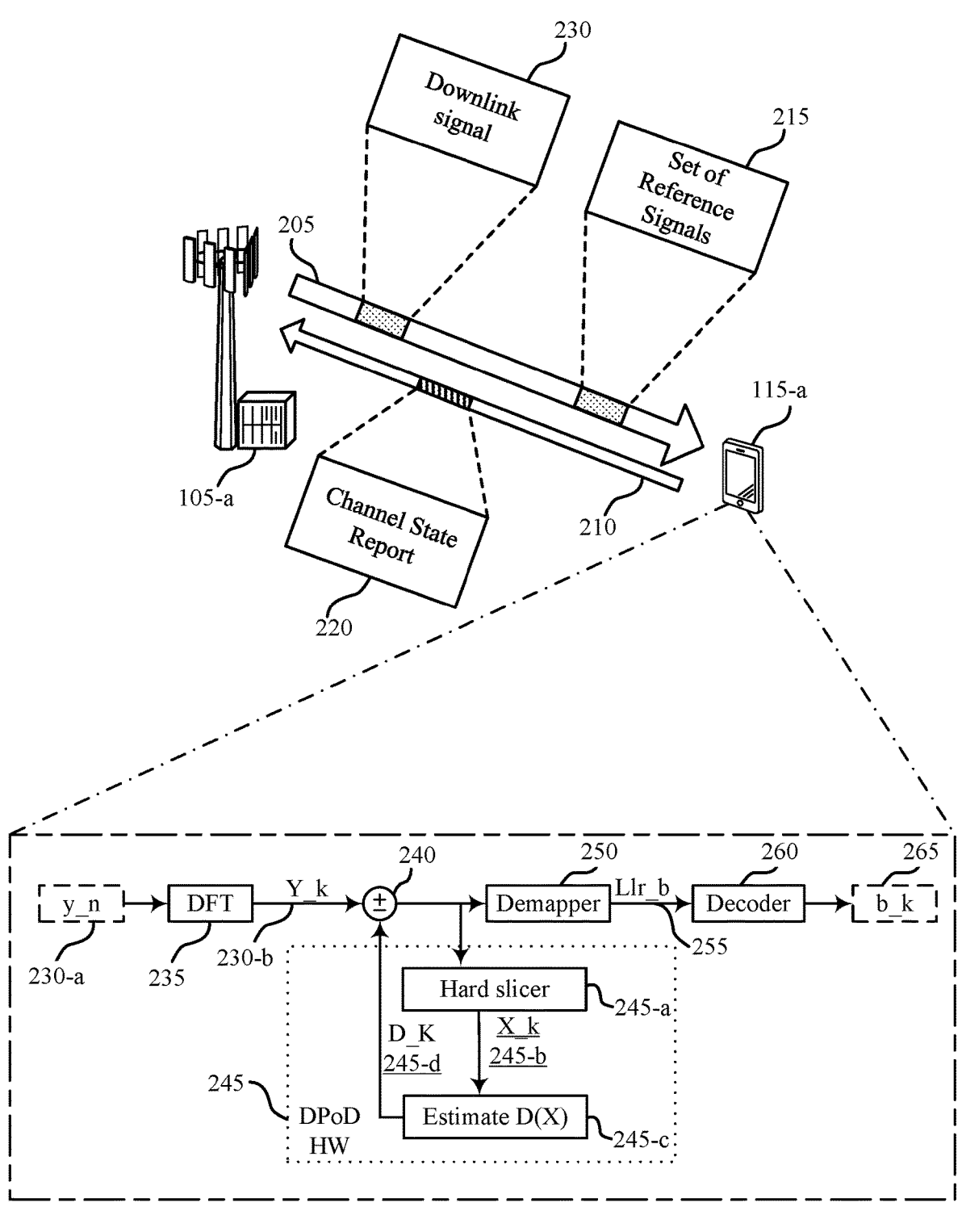
FIG. 2 illustrates an example of a wireless communications system that supports power amplifier compressed reference signals for digital post distortion detection in accordance with aspects of the present disclosure.

FIG. 2 illustrates an example of a wireless communications system 200 that supports power amplifier compressed reference signals for digital post distortion detection in accordance with aspects of the present disclosure.

FIG. 2 illustrates an example of a wireless communications system 200 that supports compressed reference signals for digital post distortion detection in accordance with aspects of the present disclosure. In some examples, some aspects of wireless communications system 200 may implement or be implemented by aspects of wireless communications system 100. In the illustrated example, the wireless communications system 200 may include a base station 105-a and a UE 115-a. The base station 105-a and the UE 115-a may be examples of corresponding devices described herein with reference to FIG. 1.

As illustrated, wireless communications system 200 may include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210.

In the illustrated example, UE 115-a may receive one or more transmissions from base station 105-a. In some cases, the one or more transmissions may include a set of reference signals 215. In some cases, the set of reference signals 215 may include at least one power amplifier uncompressed reference signal and a subset of compressed reference signals that are compressed with respective levels of power amplifier compression.

In some examples, UE 115-a may perform a channel state measurement on each reference signal of the set of reference signals 215 and transmit a channel state report 220 to base station 105-a. In some cases, UE 115-a may generate the channel state report 220 based on the channel state measurement UE 115-a performs on each reference signal of the set of reference signals 215. In some cases, the channel state report 220 may include channel state feedback associated with each reference signal of the subset of compressed reference signals and the at least one power amplifier uncompressed reference signal. In some cases, base station 105-a may select a power amplifier compression level for communications with UE 115-a based on the channel state report 220. In some examples, the base station 105-a may compare (e.g., a first comparing) channel state feedback of a first reference signal of the subset of compressed reference signals to channel state feedback of an uncompressed reference signal. In some cases, the base station 105-a may compare (e.g., a second comparing) channel state feedback of a second reference signal of the subset of compressed reference signals to channel state feedback of the uncompressed reference signal.

In some examples, the base station 105-a may determine, based at least in part on the first comparing, that the UE 115-a is capable of processing channel state feedback of the first reference signal of the subset of compressed reference signals associated with a first level of power amplifier compression. In some cases, the base station 105-a may determine, based at least in part on the second comparing, that the UE 115-a is not capable of processing channel state feedback of the second reference signal of the subset of compressed reference signals associated with a second level of power amplifier compression. In some cases, the second level of power amplifier compression may be a next highest level of power amplifier compression above the first level of power amplifier compression (e.g., next highest level of power amplifier compression in a set of compression levels associated with the set of reference signals that the base station 105-a transmits to the UE 115-a). Based on the base station 105-a determining that the UE 115-a is capable of processing the first level of power amplifier compression, but not the second level of power amplifier compression, and that the second level of power amplifier compression is the next highest level of power amplifier compression above the first level of power amplifier compression (e.g., in the set of compression levels associated with the set of reference signals), the base station 105-a may select the first level of power amplifier compression as the highest level of power amplifier compression that the UE 115-a is capable of processing of the respective levels of power amplifier compression (e.g., the set of compression levels associated with the set of reference signals). The base station 105-a and UE 115-a may then communicate with each other according to the power amplifier compression level selected by base station 105-a (e.g., the highest power amplifier compression level base station 105-a determines that UE 115-a is capable of supporting).

In the illustrated example, the communication between base station 105-a and UE 115-a may include downlink signal 230. In some cases, the base station 105-a may amplify the downlink signal 230 using a power amplifier. As the power amplifier nears saturation, this may result in a distortion that may generate non-linear noise according to a known model (e.g., power amplifier clipping), by directly affecting the mapped symbols of downlink signal 230. Thus, aspects of the amplified downlink signal 230 may be distorted. In some cases, base station 105-a may remove non-linear noise from downlink signal 230. In some other cases, UE 115-a may remove the non-linear noise from the downlink signal 230. In some cases, UE 115-a may apply a digital post distortion algorithm 245 to the received downlink signal 230 to remove the non-linear noise from the downlink signal 230. The digital post distortion algorithm 245 may be represented by Equation (1):

$$Y_k = G(X_k) + N_k = \alpha \cdot X_k + D(X_k) + N_k \tag{1}$$

where $\alpha$ may be a coefficient, such as a Bussgang coefficient, $X_k$ may be the downlink signal 230, and k may be a delay or time offset as a result of the distortion introduced by the power amplifier. The $\alpha \cdot X_k$ part of the Equation (1) may be a linear portion of the downlink signal 230 and may represent the downlink signal 230 before non-linear noise may have been introduced, for example, by the power amplifier at the base station 105-a. The non-linear model that results from the downlink signal 230 may be represented by $D(X_k)$ in the time domain. The non-linear model $D(X_k)$ may include odd-order memoryless kernels, such as $x^*|x|^2$ or $x^*|x|^4$, that may represent the power amplifier used at the base station 105-a to amplify the downlink signal 230. As such, $Y_k$ may represent the non-linearity of the signal $X_k$, which may equate to the sum of the applied kernels, where each kernel has its own coefficient. In some cases, such as large bandwidth or high signal to noise ratio (SNR), memory kernels may also be applied, such as $x[n]^*|x[n-k]|^M$ where k may be a time delay and M may be an even integer.

The UE 115-a may apply the digital post distortion algorithm 245 to the downlink signal 230 one or more times, where each iteration includes performing a hard decision slicing operation 245-a to determine estimated constellation points 245-b (e.g., X_k) and estimating nonlinear noise 245-c (e.g., estimate D(X)). In some cases, the digital post distortion algorithm 245, in conjunction with nonlinear noise 245-c, may implement a nonlinear model of a power amplifier. In order to perform the hard decision slicing operation 245-a, the UE 115-a may take the time domain signal 230-a (e.g., y_n) of the downlink signal 230 and apply demodulation operation 235 (e.g., a discrete Fourier transform (DFT)) in order to produce the demodulated downlink signal 230-b (e.g., frequency domain signal Y_k). The UE 115-a may perform the hard decision slicing operation 245-a on the demodulated downlink signal 230-b by comparing each symbol of the demodulated downlink signal 230-b to constellations in a constellation distribution that may be free of impairments and based on a modulation scheme used to modulate the downlink signal 230.

In some examples, initial iterations of digital post distortion algorithm 245 may be distorted by relatively strong noise due to the non-linearity of the received signal that has not yet been processed (e.g., reduced) by the hard decision slicing performed by digital post distortion algorithm 245 in conjunction with the hard decision slicing operation 245-a. As shown, the digital post distortion algorithm 245 may provide the estimated nonlinear noise 245-c to adder 240. In some cases, adder 240 may subtract the estimated nonlinear noise 245-c from the demodulated downlink signal 230-b, where the adder 240 provides the difference to the digital post distortion algorithm 245 and the demapper 250. As shown, the frequency-domain signal (e.g., the estimated nonlinear noise 245-c subtracted from the demodulated downlink signal 230-b) may be provided to demapper 250 to extract symbols from the frequency-domain signal. As shown, the demapper 250 may provide the extracted symbols (e.g., "LLR_b" based on log-likelihood ratio bits) to a decoder 260. In some cases, the decoder 260 may extract bits (e.g., "b_k") from the extracted symbols, and provide the extracted bits b_k as a result of the digital post distortion processing.

In some examples, the wireless communications system 200 may support multiple radio access technologies including 4G systems such as LTE systems, LTE-A systems, or LTE-A Pro systems, and 5G systems, which may be referred to as NR systems. The wireless communications system 200 may also support improvements to power consumption, spectral efficiency, higher data rates and, in some examples, may promote enhanced efficiency for higher reliability and lower latency wireless communications (e.g., uplink transmission, downlink transmission, uplink reception, and downlink reception), among other benefits.

FIG. 3 illustrates an example of a set of reference signals 300 that supports power amplifier compressed reference signals for digital post distortion detection in accordance with aspects of the present disclosure. In some examples, some aspects of the set of reference signals 300 may implement or be implemented by aspects of wireless communications system 100. In some cases, aspects of the set of reference signals 300 may be performed in relation to a base station or a UE, or both, which may be respective examples of a base station 105 and a UE 115 described with reference to FIG. 1 and FIG. 2. In the illustrated example, the set of reference signals 300 may include first channel state information reference signal (CSI-RS) 305, second CSI-RS 310, third CSI-RS 315, fourth CSI-RS 320, fifth CSI-RS 325, and sixth CSI-RS 330.

As described herein, a base station may transmit set of reference signals 300 to a UE. In some cases, the set of reference signals 300 may include at least one power amplifier uncompressed reference signal and a subset of compressed reference signals that are compressed with respective levels of power amplifier compression. As described herein, the UE may perform channel state measurements on each reference signal of the set of reference signals 300 and transmit a channel state report to the base station that includes channel state feedback associated with the power amplifier uncompressed reference signal and each reference signal of the subset of compressed reference signals.

In some examples, a base station may transmit a first set of compressed reference signals at a first compression level at a first time and transmit a second set of compressed reference signals at a second compression level at a second time (e.g., use one compression level per time period). In the illustrated example, at a first time (e.g., time t0), the base station may configure first CSI-RS 305 with no power amplifier compression level (e.g., uncompressed reference signal) and configure second CSI-RS 310 and third CSI-RS 315 with a first power amplifier compression level. In some cases, at a second time (e.g., time t1), the base station may configure fourth CSI-RS 320 with no power amplifier compression level (e.g., uncompressed reference signal) and configure fifth CSI-RS 325 and sixth CSI-RS 330 with a second power amplifier compression level that is different (e.g., higher or lower) than the first power amplifier compression level.

In some examples, a base station may transmit reference signals using different power amplifier compression levels per frequency range. In the illustrated example, at a first frequency range 335, the base station may configure first CSI-RS 305 and fourth CSI-RS 320 with no power amplifier compression level (e.g., uncompressed reference signal). As shown, at a second frequency range 340, the base station may configure second CSI-RS 310 and fifth CSI-RS 325 with a first power amplifier compression level. As shown, at a third frequency range 345, the base station may configure third CSI-RS 315 and sixth CSI-RS 330 with a second power amplifier compression level that is different (e.g., higher or lower) than the first power amplifier compression level.

In some examples, a base station may transmit reference signals using different power amplifier compression levels over time and frequency. In the illustrated example, at a first frequency range 335, the base station may configure first CSI-RS 305 and fourth CSI-RS 320 with no power amplifier compression level (e.g., uncompressed reference signal). As shown, at the second frequency range 340 and time t0, the base station may configure second CSI-RS 310 with a first power amplifier compression level. At the third frequency range 345 and time to, the base station may configure third CSI-RS 315 with a second power amplifier compression level that is different (e.g., higher or lower) than the first power amplifier compression level. At the second frequency range 340 and time t1, the base station may configure fifth CSI-RS 325 with a third power amplifier compression level that is different (e.g., higher or lower) than the first and second power amplifier compression levels. At the third frequency range 345 and time t1, the base station may configure sixth CSI-RS 330 with a fourth power amplifier compression level that is different (e.g., higher or lower) than the first, second, and third power amplifier compression levels.

Figure 4:
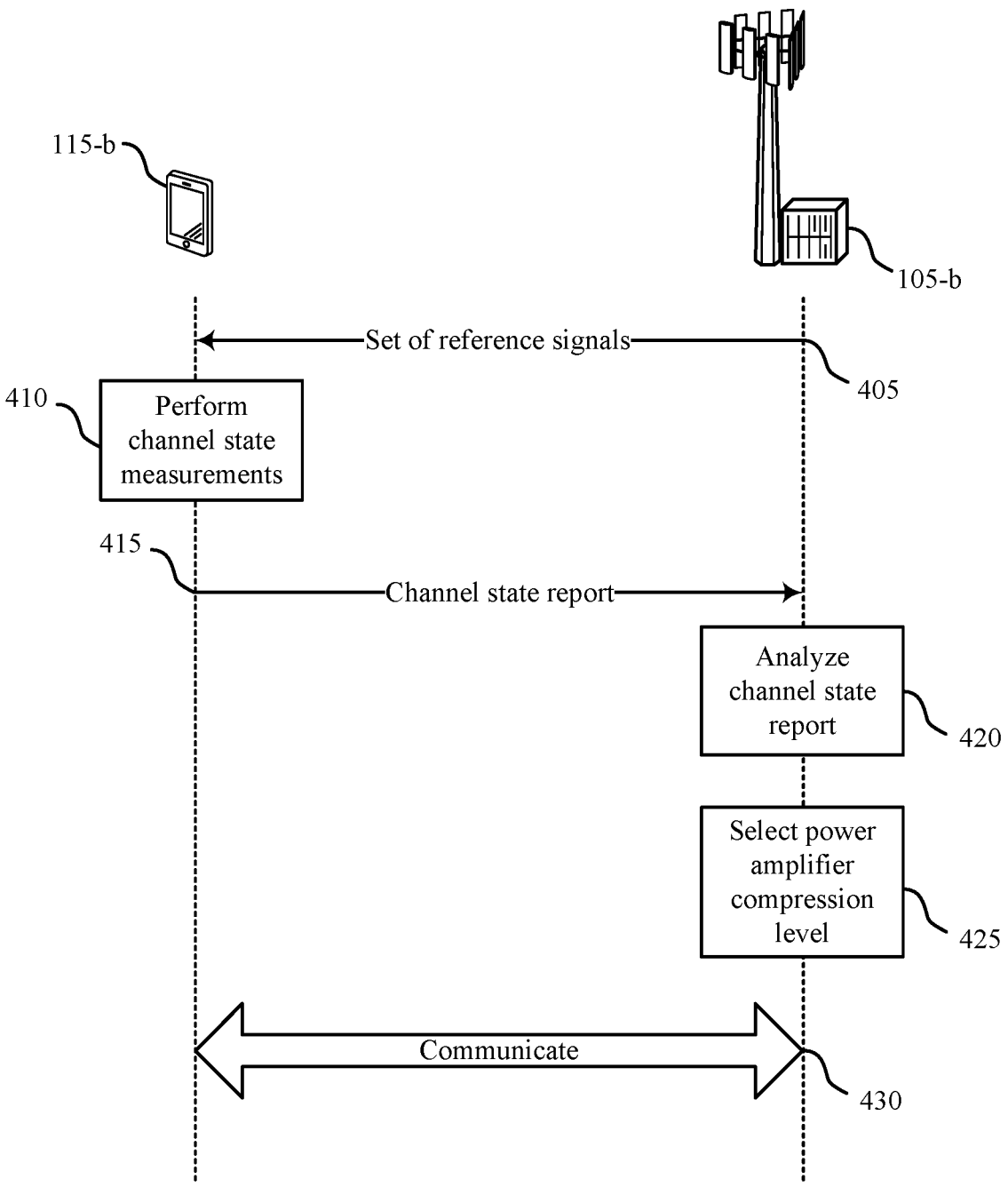
FIG. 4 illustrates an example of a process flow that supports power amplifier compressed reference signals for digital post distortion detection in accordance with aspects of the present disclosure.

FIG. 4 illustrates an example of a process flow 400 that supports power amplifier compressed reference signals for digital post distortion detection in accordance with aspects of the present disclosure. In some examples, some aspects of process flow 400 may implement or be implemented by aspects of wireless communications system 100. In the illustrated example, process flow 400 may include a base station 105-b and UE 115-b, which may be examples of a base station 105 and a UE 115 described with reference to FIG. 1 and FIG. 2.

At 405, base station 105-b may transmit a set of reference signals to UE 115-b. The set of reference signals may include a power amplifier uncompressed reference signal and a subset of compressed reference signals that are compressed with respective levels of power amplifier compression. In some cases, the set of reference signals may include at least one uncompressed reference signal. In some cases, the subset of compressed reference signals being transmitted at respective levels of power amplifier compression may be based on base station 105-b operating at least one power amplifier of a transmitter of base station 105-b in a compression region of the at least one power amplifier. A first reference signal of the subset of compressed reference signals may be based on the at least one power amplifier operating at a first compression level of the compression region (e.g., based on a first input power level of the at least one power amplifier). A second reference signal of the subset of compressed reference signals may be based on the at least one power amplifier operating at a second compression level of the compression region (e.g., based on a second input power level of the at least one power amplifier), and so on. In some cases, the second compression level may be at a different compression level than the first compression level (e.g., higher compression level or lower compression level).

At 410, UE 115-b may perform a channel state measurement on at least a portion of reference signals of the set of reference signals that UE 115-b receives from base station 105-b. In some cases, UE 115-b may perform a channel state measurement on each reference signal of the set of reference signals that UE 115-b receives from base station 105-b. In some cases, UE 115-b may estimate the channel state feedback of each reference signal of the set of reference signals. The channel state feedback may include a PMI, a CQI, a RI, or a MCS value, or any combination thereof.

At 415, UE 115-b may transmit a channel state report to base station 105-b. In some cases, UE 115-b may transmit the channel state report to base station 105-b based on the channel state measurements UE 115-b performed on each reference signal that UE 115-b received from base station 105-b (e.g., each reference signal of the subset of compressed reference signals and the power amplifier uncompressed reference signal).

At 420, base station 105-b may analyze the channel state report. The analyzing may include the base station 105-b comparing channel state feedback of a power amplifier compressed reference signal of the subset of compressed reference signals to channel state feedback of the power amplifier uncompressed reference signal (e.g., to channel state feedback of at least one power amplifier uncompressed reference signal). In some cases, the base station 105-b may average the channel state feedback of two or more power amplifier uncompressed reference signals and compare channel state feedback of a power amplifier compressed reference signal to the average channel state feedback of the two or more power amplifier uncompressed reference signals. In some cases, the analyzing may include base station 105-b determining, based on a result of the comparing, a highest level of power amplifier compression that UE 115-b is capable of processing of the respective levels of power amplifier compression.

In some cases, the analyzing may include the base station 105-b receiving channel state feedback of an uncompressed reference signal (e.g., at least one uncompressed reference signal), channel state feedback of a first compressed reference signal, channel state feedback of a second compressed reference signal, and channel state feedback of a third compressed reference signal (e.g., channel state feedback of the subset of compressed reference signals). The channel state feedback of a compressed reference signal or an uncompressed reference signal may include PMI, RI, CQI, or MCS value, or any combination thereof.

The base station 105-b may compare the channel state feedback of the uncompressed reference signal to the channel state feedback of each of the multiple compressed reference signals. The base station 105-b may determine whether a value of the channel state feedback (e.g., PMI, RI, CQI, or MCS value, or any combination thereof) of a compressed reference signal is within a predetermined range (e.g., within X % of a set value or range of values, within X points of a set value or range of values, etc.) of a corresponding value of the channel state feedback of the uncompressed reference signal.

When a value of the channel state feedback of the first compressed reference signal and a value of the channel state feedback of the second compressed reference signal are each within a predetermined range of a corresponding value of the channel state feedback of the uncompressed reference signal, the base station 105-b may determine that the UE 115-b is capable of processing references signals at the power amplifier compression level associated with the first compressed reference signal and references signals at the power amplifier compression level associated with the second compressed reference signal.

However, when a value of the channel state feedback of the third compressed reference signal is not within the predetermined range of a corresponding value of the channel state feedback of the uncompressed reference signal, the base station 105-b may determine that the UE 115-b is incapable of processing or not configured to process references signals at the power amplifier compression level associated with the third compressed reference signal.

In some cases, the power amplifier compression level associated with the third compressed reference signal may be greater (e.g., higher power amplifier compression) than the power amplifier compression level associated with the second compressed reference signal, and the power amplifier compression level associated with the second compressed reference signal may be greater (e.g., higher power amplifier compression) than the power amplifier compression level associated with the first compressed reference signal.

At 425, base station 105-b may select a power amplifier compression level for communications with UE 115-b based on the channel state report (e.g., based on the analysis of the channel state report). In some cases, the power amplifier compression level selected by base station 105-b may be the highest level of power amplifier compression that base station 105-b determines UE 115-b is capable of processing.

In some cases, base station 105-b may determine that UE 115-b is capable of processing channel state feedback of a first reference signal of the subset of compressed reference signals associated with a first level of power amplifier compression, determine that UE 115-b is not capable of processing channel state feedback of a second reference signal of the subset of compressed reference signals associated with a second level of power amplifier compression, where the second level of power amplifier compression is a higher power amplifier compression than the second level of power amplifier compression. Accordingly, base station 105-b may select the first level of power amplifier compression as the highest level of power amplifier compression that UE 115-b is capable of processing of the respective levels of power amplifier compression.

At 430, base station 105-b and UE 115-b may communicate with each other based on the power amplifier compression level selected and implemented by base station 105-b in accordance with the channel state report. In some cases, base station 105-b using the selected power amplifier compression level may include base station 105-b using a power amplifier to transmit control signals or data signals, or both, to UE 115-b, where a compression level of the power amplifier associated with the transmitter of base station 105-b transmitting the signals is set to the selected power amplifier compression level.

In some cases, setting the compression level of the power amplifier to the selected power amplifier compression level may include base station 105-b setting an input level of the power amplifier that results in the power amplifier operating at the selected power amplifier compression level. In some cases, the communicating may include UE 115-b receiving a signal from base station 105-b that is compressed with the power amplifier compression level selected by base station 105-b. In some cases, UE 115-b may apply digital post distortion reduction to the received signal based on a digital post distortion model supported by UE 115-b. In some cases, the applying of the digital post distortion reduction may be based on coefficients of the digital post distortion model supported by UE 115-b.

Figure 5:
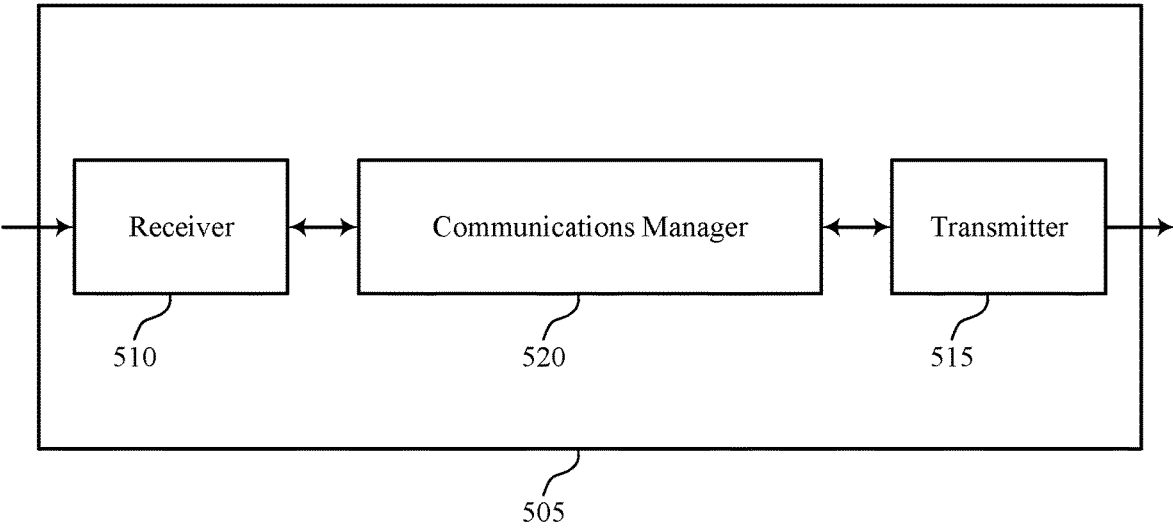
FIGS. 5 and 6 show block diagrams of devices that support power amplifier compressed reference signals for digital post distortion detection in accordance with aspects of the present disclosure.

FIG. 5 shows a block diagram 500 of a device 505 that supports power amplifier compressed reference signals for digital post distortion detection in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power amplifier compressed reference signals for digital post distortion detection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power amplifier compressed reference signals for digital post distortion detection). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of power amplifier compressed reference signals for digital post distortion detection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station in accordance with examples as disclosed herein. For example, the communications manager 520 may be configured as or otherwise support a means for transmitting a set of reference signals to a UE, the set of reference signals including a power amplifier uncompressed reference signal and a subset of compressed reference signals that are compressed with respective levels of power amplifier compression. The communications manager 520 may be configured as or otherwise support a means for receiving a channel state report from the UE including channel state feedback associated with the power amplifier uncompressed reference signal and each reference signal of the subset of compressed reference signals. The communications manager 520 may be configured as or otherwise support a means for selecting a power amplifier compression level for communications with the UE based at least in part on the channel state report. The communications manager 520 may be configured as or otherwise support a means for communicating with the UE according to the selected power amplifier compression level.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased power amplifier efficiency, increased power savings, and increased battery life. The described techniques may also support reduced processing, reduced power consumption, more efficient utilization of communication resources, among other benefits.

Figure 6:
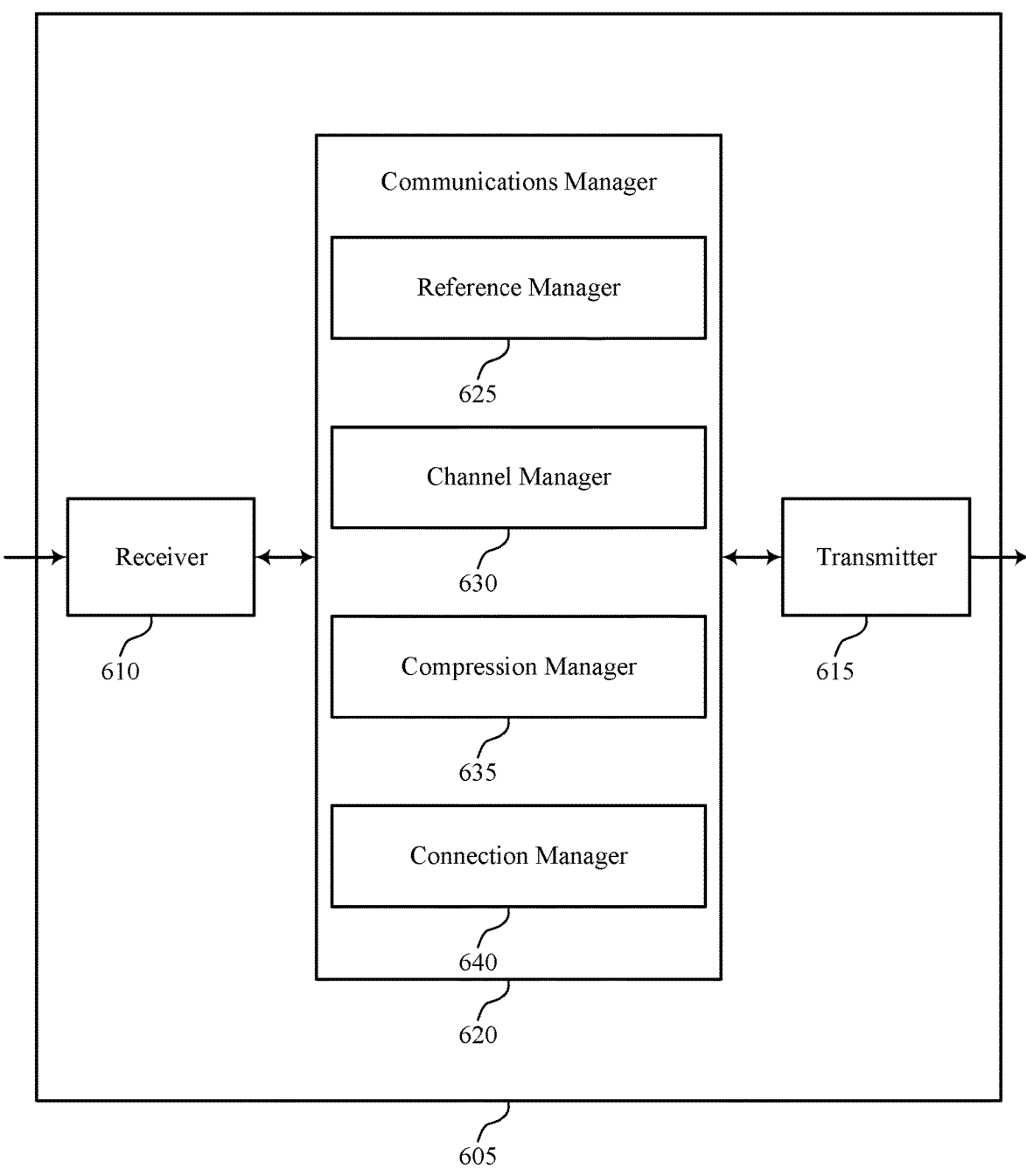

FIG. 6 shows a block diagram 600 of a device 605 that supports power amplifier compressed reference signals for digital post distortion detection in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power amplifier compressed reference signals for digital post distortion detection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power amplifier compressed reference signals for digital post distortion detection). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power amplifier compressed reference signals for digital post distortion detection as described herein. For example, the communications manager 620 may include a reference manager 625, a channel manager 630, a compression manager 635, a connection manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. The reference manager 625 may be configured as or otherwise support a means for transmitting a set of reference signals to a UE, the set of reference signals including a power amplifier uncompressed reference signal and a subset of compressed reference signals that are compressed with respective levels of power amplifier compression. The channel manager 630 may be configured as or otherwise support a means for receiving a channel state report from the UE including channel state feedback associated with the power amplifier uncompressed reference signal and each reference signal of the subset of compressed reference signals. The compression manager 635 may be configured as or otherwise support a means for selecting a power amplifier compression level for communications with the UE based at least in part on the channel state report. The connection manager 640 may be configured as or otherwise support a means for communicating with the UE according to the selected power amplifier compression level.

Figure 7:
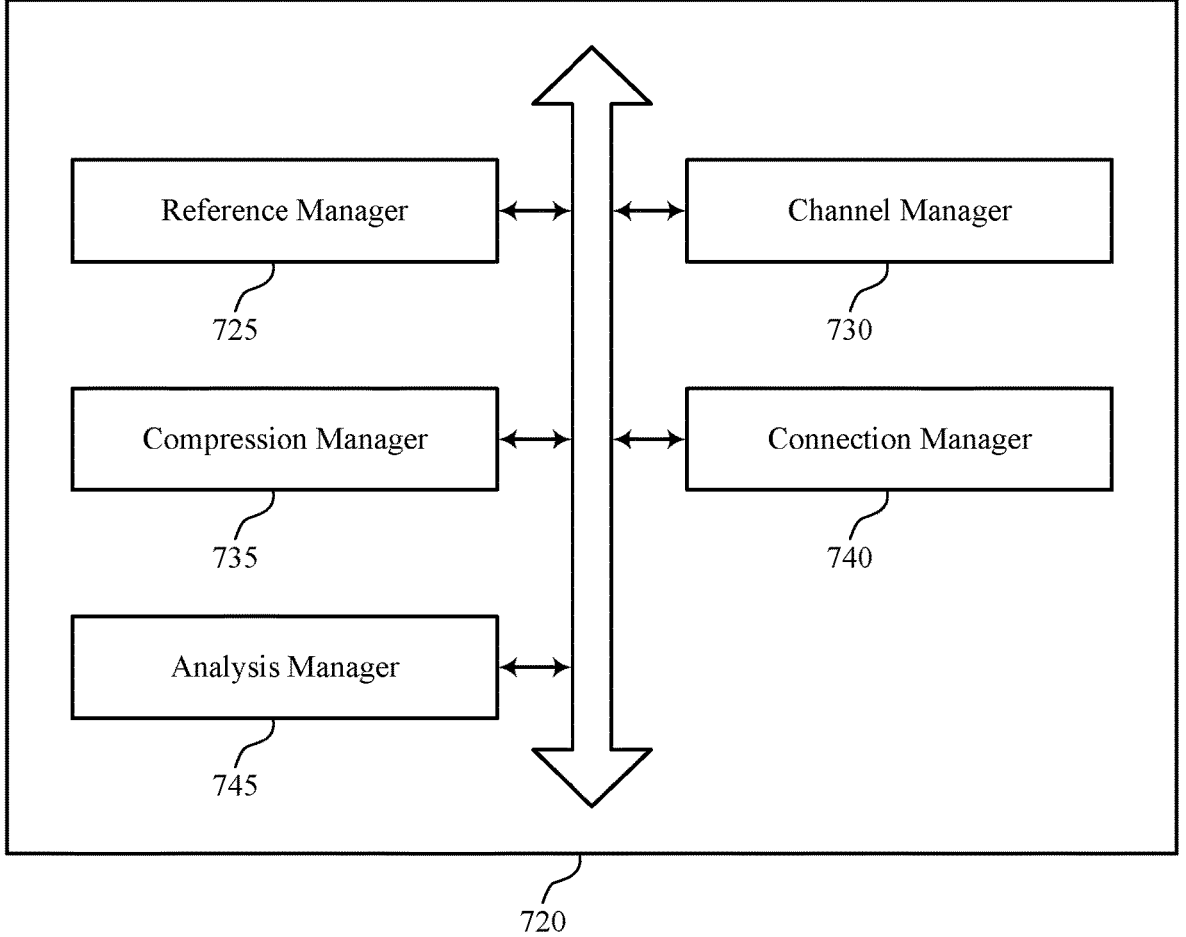
FIG. 7 shows a block diagram of a communications manager that supports power amplifier compressed reference signals for digital post distortion detection in accordance with aspects of the present disclosure.

FIG. 7 shows a block diagram 700 of a communications manager 720 that supports power amplifier compressed reference signals for digital post distortion detection in accordance with aspects of the present disclosure. The communications manager 720 may be an example of aspects of a communications manager 520, a communications manager 620, or both, as described herein. The communications manager 720, or various components thereof, may be an example of means for performing various aspects of power amplifier compressed reference signals for digital post distortion detection as described herein. For example, the communications manager 720 may include a reference manager 725, a channel manager 730, a compression manager 735, a connection manager 740, an analysis manager 745, or any combination thereof. Each of these components may communicate, directly or indirectly, with one another (e.g., via one or more buses).

The communications manager 720 may support wireless communication at a base station in accordance with examples as disclosed herein. The reference manager 725 may be configured as or otherwise support a means for transmitting a set of reference signals to a UE, the set of reference signals including a power amplifier uncompressed reference signal and a subset of compressed reference signals that are compressed with respective levels of power amplifier compression. The channel manager 730 may be configured as or otherwise support a means for receiving a channel state report from the UE including channel state feedback associated with the power amplifier uncompressed reference signal and each reference signal of the subset of compressed reference signals. The compression manager 735 may be configured as or otherwise support a means for selecting a power amplifier compression level for communications with the UE based at least in part on the channel state report. The connection manager 740 may be configured as or otherwise support a means for communicating with the UE according to the selected power amplifier compression level.

In some examples, the analysis manager 745 may be configured as or otherwise support a means for comparing channel state feedback of at least one reference signal of the subset of compressed reference signals to channel state feedback of the power amplifier uncompressed reference signal. In some examples, the analysis manager 745 may be configured as or otherwise support a means for determining, based at least in part on a result of the comparing, a highest level of power amplifier compression that the UE is capable of processing of the respective levels of power amplifier compression.

In some examples, to support determining the highest level of power amplifier compression that the UE is capable of processing, the analysis manager 745 may be configured as or otherwise support a means for determining that the UE is capable of processing channel state feedback of a first reference signal of the subset of compressed reference signals associated with a first level of power amplifier compression. In some examples, to support determining the highest level of power amplifier compression that the UE is capable of processing, the analysis manager 745 may be configured as or otherwise support a means for determining that the UE is not capable of processing channel state feedback of a second reference signal of the subset of compressed reference signals associated with a second level of power amplifier compression. In some examples, to support determining the highest level of power amplifier compression that the UE is capable of processing, the analysis manager 745 may be configured as or otherwise support a means for selecting the first level of power amplifier compression as the highest level of power amplifier compression that the UE is capable of processing of the respective levels of power amplifier compression.

In some examples, the second level of power amplifier compression is a next highest level of power amplifier compression above the first level of power amplifier compression of the respective levels of power amplifier compression. In some examples, the highest level of power amplifier compression that the UE is capable of processing is based at least in part on a coefficient of a digital post distortion model supported by the UE.

In some examples, the selected power amplifier compression level is selected from the respective levels of power amplifier compression of the subset of compressed reference signals. In some examples, the channel state feedback includes a pre-coding matrix indicator, a channel quality indicator, or a rank indicator, or any combination thereof.

In some examples, the set of reference signals include channel state information reference signals. In some examples, the set of reference signals to are transmitted periodically or aperiodically.

In some examples, the power amplifier uncompressed reference signal is transmitted by a transmitter of the base station while a power amplifier of the transmitter is operating in a linear region. In some examples, the subset of compressed reference signals is transmitted by a transmitter of the base station while a power amplifier of the transmitter is operating in a compression region.

Figure 8:
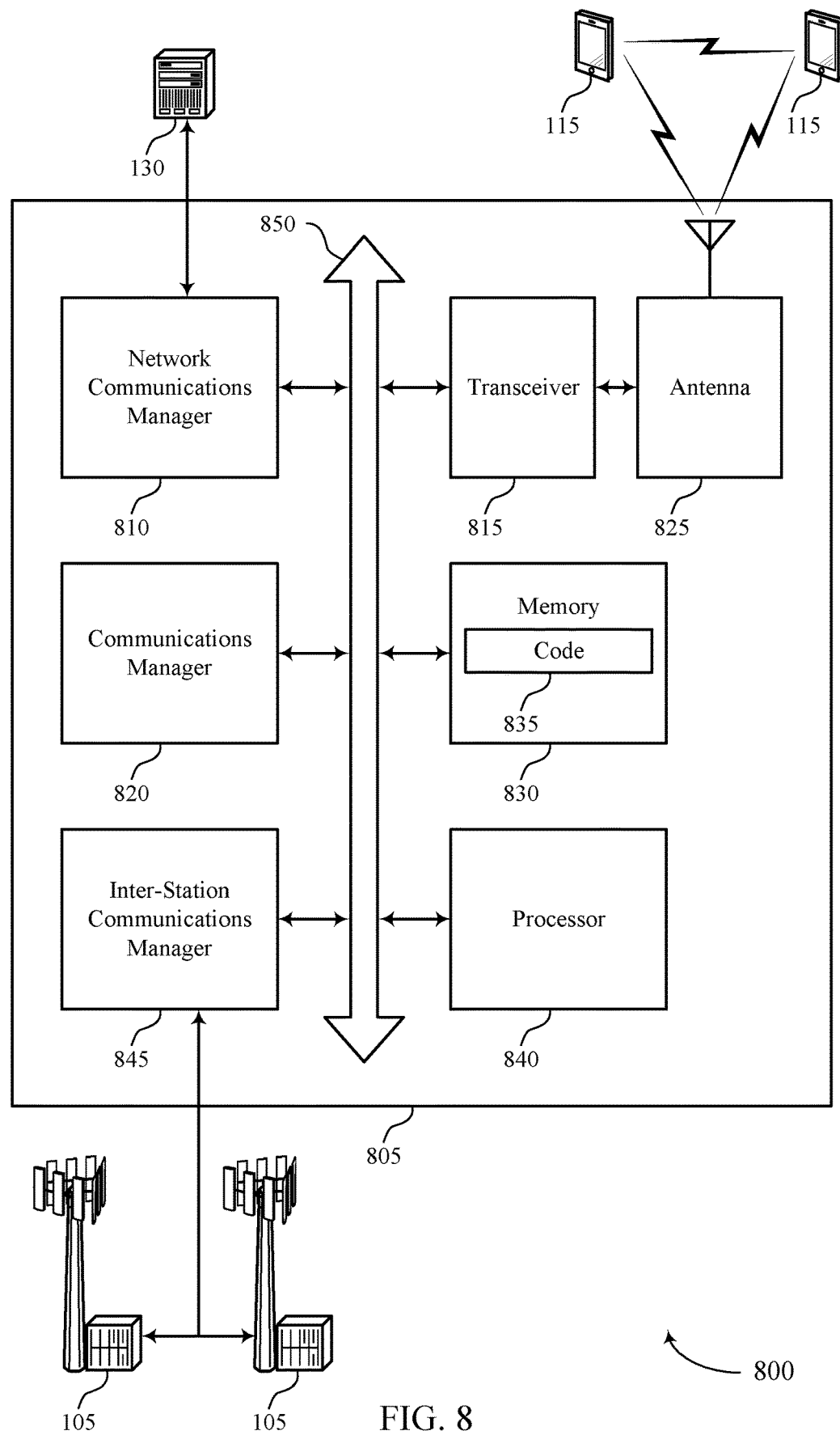
FIG. 8 shows a diagram of a system including a device that supports power amplifier compressed reference signals for digital post distortion detection in accordance with aspects of the present disclosure.

FIG. 8 shows a diagram of a system 800 including a device 805 that supports power amplifier compressed reference signals for digital post distortion detection in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting power amplifier compressed reference signals for digital post distortion detection). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations

105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station in accordance with examples as disclosed herein. For example, the communications manager 820 may be configured as or otherwise support a means for transmitting a set of reference signals to a UE, the set of reference signals including a power amplifier uncompressed reference signal and a subset of compressed reference signals that are compressed with respective levels of power amplifier compression. The communications manager 820 may be configured as or otherwise support a means for receiving a channel state report from the UE including channel state feedback associated with the power amplifier uncompressed reference signal and each reference signal of the subset of compressed reference signals. The communications manager 820 may be configured as or otherwise support a means for selecting a power amplifier compression level for communications with the UE based at least in part on the channel state report. The communications manager 820 may be configured as or otherwise support a means for communicating with the UE according to the selected power amplifier compression level.

By including or configuring the communications manager 820 in accordance with examples as described herein, the device 805 may support techniques for increased power amplifier efficiency, increased power savings, and increased battery life. The described techniques may also support improved communication reliability, reduced latency, improved user experience related to reduced processing, reduced power consumption, more efficient utilization of communication resources, improved coordination between devices, longer battery life, improved utilization of processing capability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of power amplifier compressed reference signals for digital post distortion detection as described herein, or the processor 840 and the memory 830 may be otherwise configured to perform or support such operations.

Figure 9:
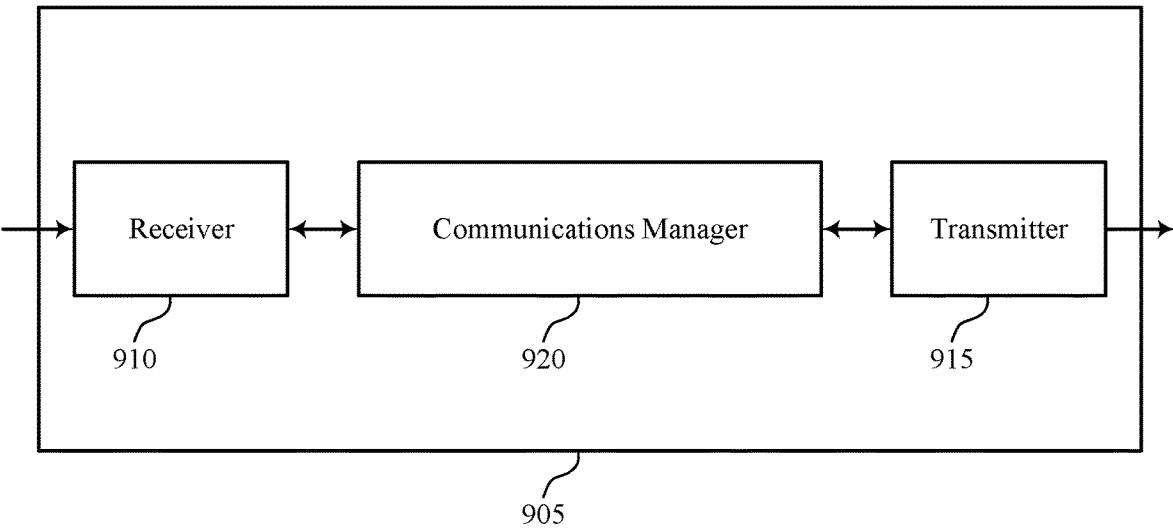
FIGS. 9 and 10 show block diagrams of devices that support power amplifier compressed reference signals for digital post distortion detection in accordance with aspects of the present disclosure.

FIG. 9 shows a block diagram 900 of a device 905 that supports power amplifier compressed reference signals for digital post distortion detection in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power amplifier compressed reference signals for digital post distortion detection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power amplifier compressed reference signals for digital post distortion detection). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of power amplifier compressed reference signals for digital post distortion detection as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from a base station, a set of reference signals including a power amplifier uncompressed reference signal and a subset of compressed reference signals that are compressed with respective levels of power amplifier compression. The communications manager 920 may be configured as or otherwise support a means for performing a channel state measurement on each reference signal of the set of reference signals. The communications manager 920 may be configured as or otherwise support a means for transmitting, to the base station based at least in part on the channel state measurement performed on each reference signal, a channel state report including channel state feedback associated with each reference signal of the subset of compressed reference signals and the power amplifier uncompressed reference signal. The communications manager 920 may be configured as or otherwise support a means for communicating with the base station based at least in part on a power amplifier compression level that is implemented in accordance with the channel state report.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increased power amplifier efficiency, increased power savings, and increased battery life. The described techniques may also support reduced processing, reduced power consumption, more efficient utilization of communication resources, among other benefits.

Figure 10:
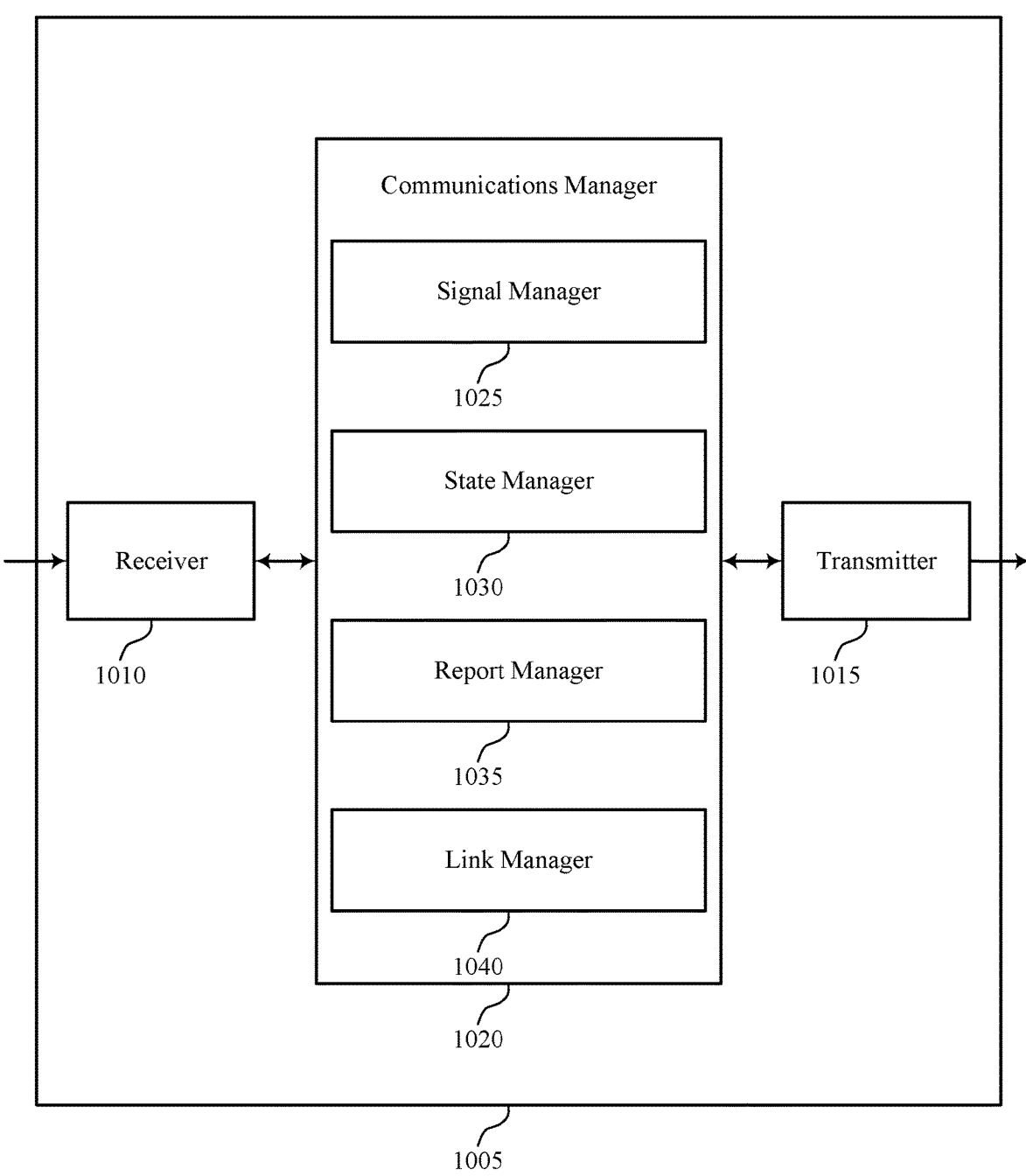

FIG. 10 shows a block diagram 1000 of a device 1005 that supports power amplifier compressed reference signals for digital post distortion detection in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power amplifier compressed reference signals for digital post distortion detection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power amplifier compressed reference signals for digital post distortion detection). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of power amplifier compressed reference signals for digital post distortion detection as described herein. For example, the communications manager 1020 may include a signal manager 1025, a state manager 1030, a report manager 1035, a link manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The signal manager 1025 may be configured as or otherwise support a means for receiving, from a base station, a set of reference signals including a power amplifier uncompressed reference signal and a subset of compressed reference signals that are compressed with respective levels of power amplifier compression. The state manager 1030 may be configured as or otherwise support a means for performing a channel state measurement on each reference signal of the set of reference signals. The report manager 1035 may be configured as or otherwise support a means for transmitting, to the base station based at least in part on the channel state measurement performed on each reference signal, a channel state report including channel state feedback associated with each reference signal of the subset of compressed reference signals and the power amplifier uncompressed reference signal. The link manager 1040 may be configured as or otherwise support a means for communicating with the base station based at least in part on a power amplifier compression level that is implemented in accordance with the channel state report.

Figure 11:
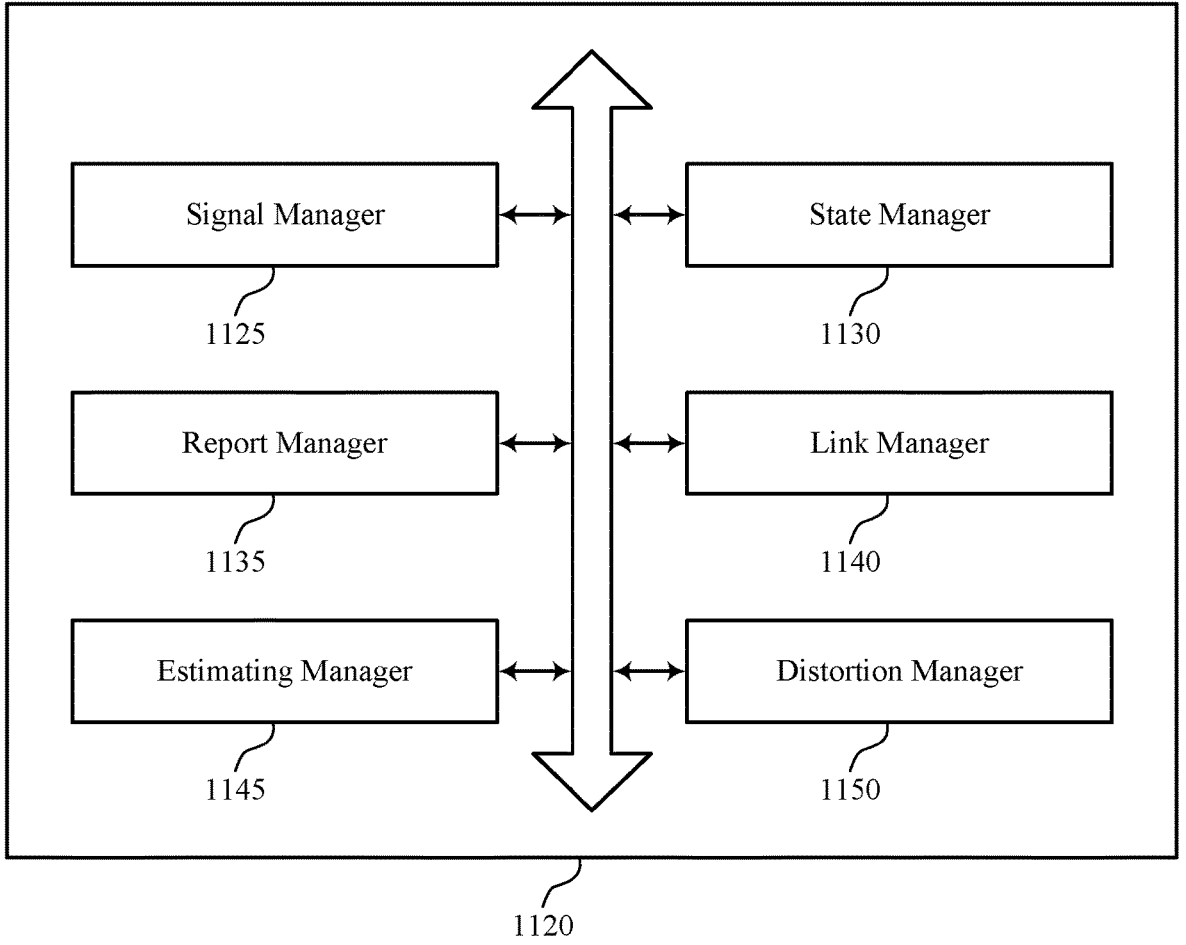
FIG. 11 shows a block diagram of a communications manager that supports power amplifier compressed reference signals for digital post distortion detection in accordance with aspects of the present disclosure.

FIG. 11 shows a block diagram 1100 of a communications manager 1120 that supports power amplifier compressed reference signals for digital post distortion detection in accordance with aspects of the present disclosure. The communications manager 1120 may be an example of aspects of a communications manager 920, a communications manager 1020, or both, as described herein. The communications manager 1120, or various components thereof, may be an example of means for performing various aspects of power amplifier compressed reference signals for digital post distortion detection as described herein. For example, the communications manager 1120 may include a signal manager 1125, a state manager 1130, a report manager 1135, a link manager 1140, an estimating manager 1145, a distortion manager 1150, or any combination thereof. Each of these components may communicate, directly or indirectly, with one another (e.g., via one or more buses).

The communications manager 1120 may support wireless communication at a UE in accordance with examples as disclosed herein. The signal manager 1125 may be configured as or otherwise support a means for receiving, from a base station, a set of reference signals including a power amplifier uncompressed reference signal and a subset of compressed reference signals that are compressed with respective levels of power amplifier compression. The state manager 1130 may be configured as or otherwise support a means for performing a channel state measurement on each reference signal of the set of reference signals. The report manager 1135 may be configured as or otherwise support a means for transmitting, to the base station based at least in part on the channel state measurement performed on each reference signal, a channel state report including channel state feedback associated with each reference signal of the subset of compressed reference signals and the power amplifier uncompressed reference signal. The link manager 1140 may be configured as or otherwise support a means for communicating with the base station based at least in part on a power amplifier compression level that is implemented in accordance with the channel state report.

In some examples, to support performing the channel state measurement on each reference signal of the set of reference signals, the estimating manager 1145 may be configured as or otherwise support a means for estimating the channel state feedback of each reference signal of the set of reference signals, the channel state feedback including a pre-coding matrix indicator, a channel quality indicator, a rank indicator, or a modulation and coding scheme value, or any combination thereof.

In some examples, to support communicating with the base station, the distortion manager 1150 may be configured as or otherwise support a means for receiving a signal from the base station that is compressed with the power amplifier compression level that is implemented in accordance with the channel state report. In some examples, to support communicating with the base station, the distortion manager 1150 may be configured as or otherwise support a means for applying digital post distortion reduction to the received signal based at least in part on a digital post distortion model supported by the UE.

In some examples, applying digital post distortion reduction is based at least in part on coefficients of the digital post distortion model that are supported by the UE. In some examples, the power amplifier compression level that is implemented in accordance with the channel state report is based at least in part on the coefficients of the digital post distortion model, the coefficients including one or more weights of a Volterra filter.

In some examples, the set of reference signals are received periodically or aperiodically. In some examples, transmission of the power amplifier uncompressed reference signal is based at least in part on a power amplifier of the base station operating in a linear region. In some examples, transmission of the subset of compressed reference signals is based at least in part on a power amplifier of the base station operating in a compression region.

Figure 12:
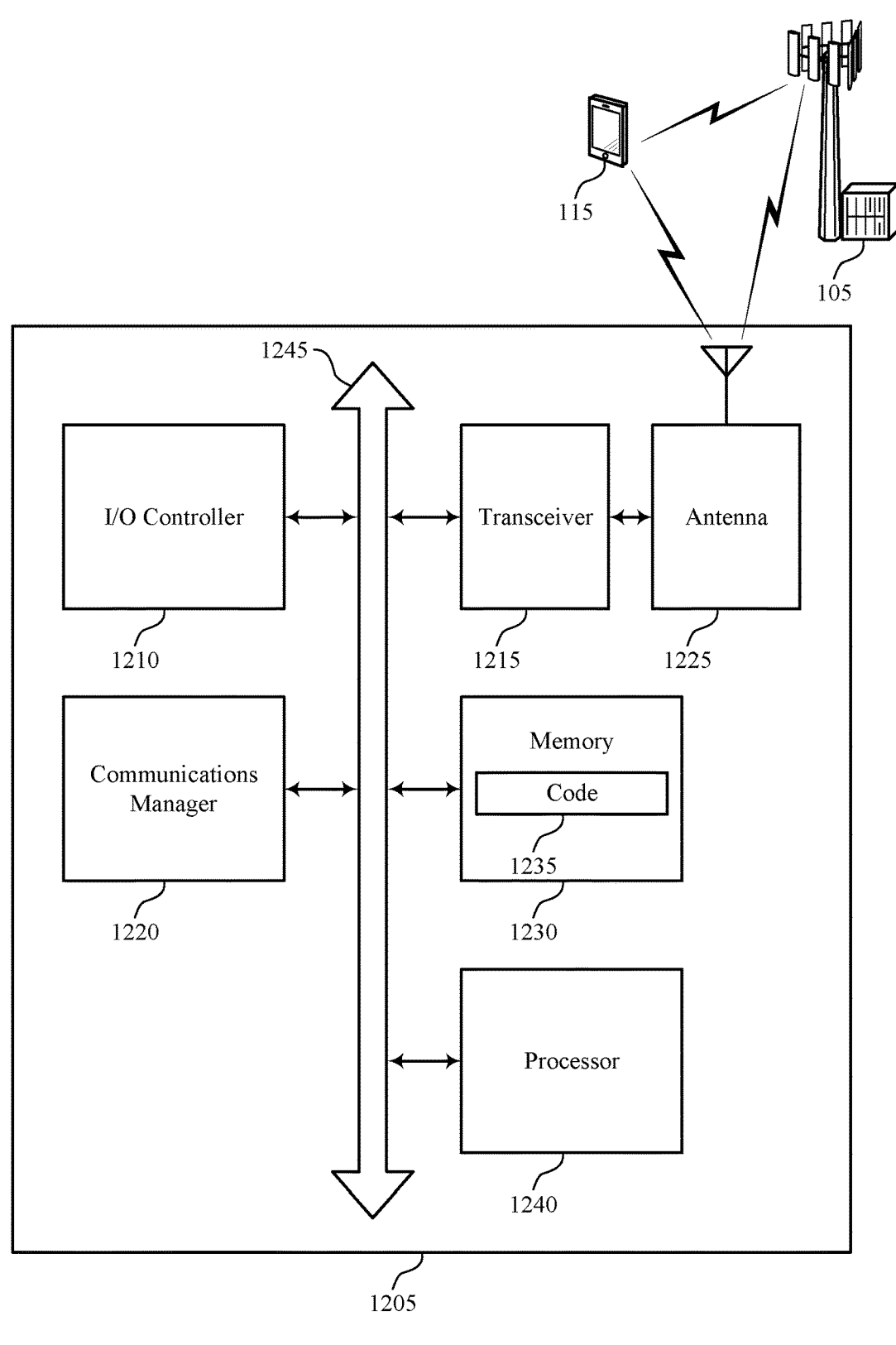
FIG. 12 shows a diagram of a system including a device that supports power amplifier compressed reference signals for digital post distortion detection in accordance with aspects of the present disclosure.

FIG. 12 shows a diagram of a system 1200 including a device 1205 that supports power amplifier compressed reference signals for digital post distortion detection in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WIN-DOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power amplifier compressed reference signals for digital post distortion detection). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a base station, a set of reference signals including a power amplifier uncompressed reference signal and a subset of compressed reference signals that are compressed with respective levels of power amplifier compression. The communications manager 1220 may be configured as or otherwise support a means for performing a channel state measurement on each reference signal of the set of reference signals. The communications manager 1220 may be configured as or otherwise support a means for transmitting, to the base station based at least in part on the channel state measurement performed on each reference signal, a channel state report including channel state feedback associated with each reference signal of the subset of compressed reference signals and the power amplifier uncompressed reference signal. The communications manager 1220 may be configured as or otherwise support a means for communicating with the base station based at least in part on a power amplifier compression level that is implemented in accordance with the channel state report.

By including or configuring the communications manager 1220 in accordance with examples as described herein, the device 1205 may support techniques for increased power amplifier efficiency, increased power savings, and increased battery life. The described techniques may also support improved communication reliability, reduced latency, improved user experience related to reduced processing, reduced power consumption, more efficient utilization of communication resources, improved coordination between devices, longer battery life, improved utilization of processing capability), among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of power amplifier compressed reference signals for digital post distortion detection as described herein, or the processor 1240 and the memory 1230 may be otherwise configured to perform or support such operations.

FIG. 13 shows a flowchart illustrating a method 1300 that supports power amplifier compressed reference signals for digital post distortion detection in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include transmitting a set of reference signals to a UE, the set of reference signals including a power amplifier uncompressed reference signal and a subset of compressed reference signals that are compressed with respective levels of power amplifier compression. The operations of 1305 may be performed in accordance with examples as disclosed herein. In some examples, aspects of the operations of 1305 may be performed by a reference manager 725 as described with reference to FIG. 7.

At 1310, the method may include receiving a channel state report from the UE including channel state feedback associated with the power amplifier uncompressed reference signal and each reference signal of the subset of compressed reference signals. The operations of 1310 may be performed in accordance with examples as disclosed herein. In some examples, aspects of the operations of 1310 may be performed by a channel manager 730 as described with reference to FIG. 7.

At 1315, the method may include selecting a power amplifier compression level for communications with the UE based at least in part on the channel state report. The operations of 1315 may be performed in accordance with examples as disclosed herein. In some examples, aspects of the operations of 1315 may be performed by a compression manager 735 as described with reference to FIG. 7.

At 1320, the method may include communicating with the UE according to the selected power amplifier compression level. The operations of 1320 may be performed in accordance with examples as disclosed herein. In some examples, aspects of the operations of 1320 may be performed by a connection manager 740 as described with reference to FIG. 7.

Figure 14:
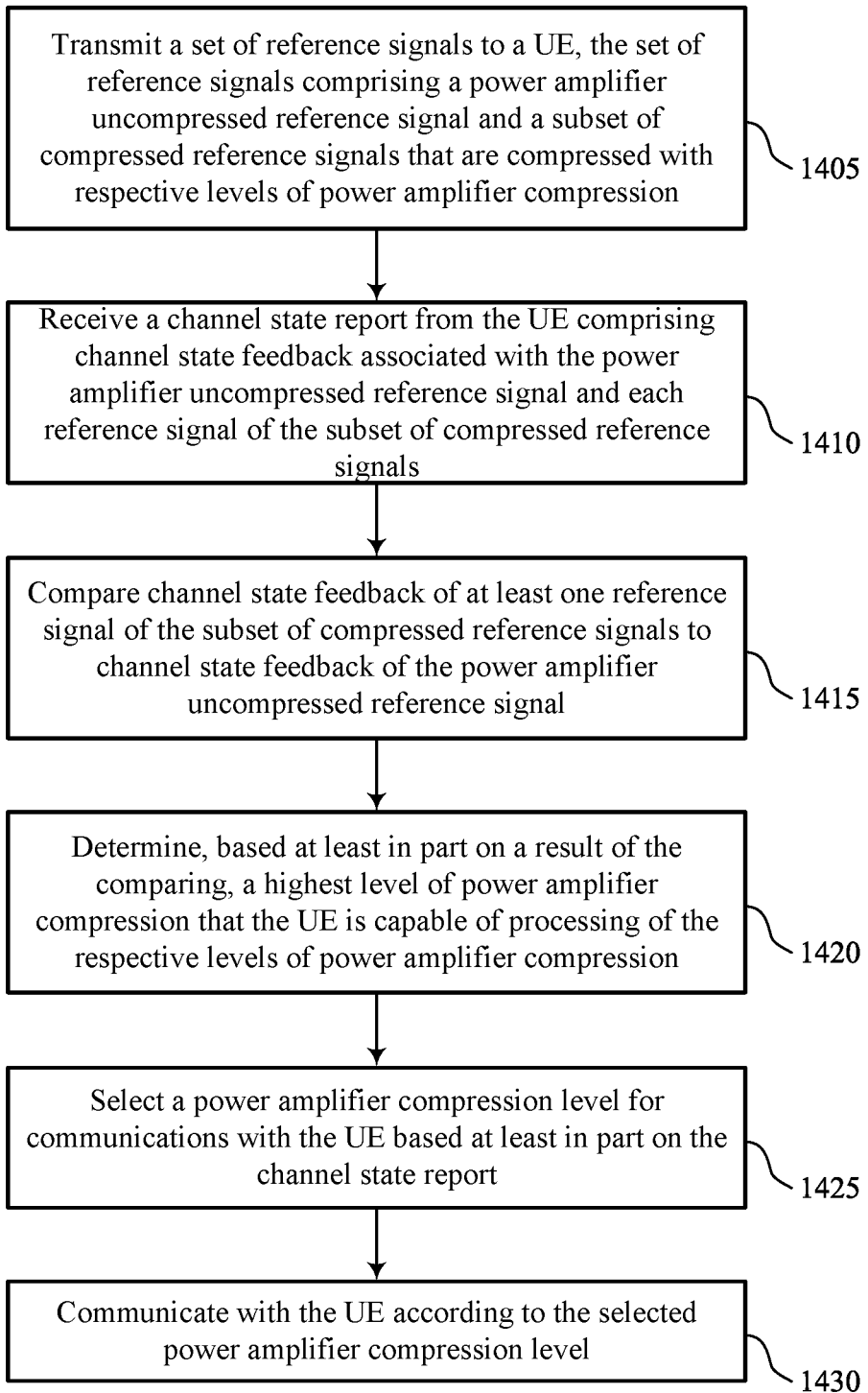

FIG. 14 shows a flowchart illustrating a method 1400 that supports power amplifier compressed reference signals for digital post distortion detection in accordance with aspects of the present disclosure. The operations of the method 1400 may be implemented by a base station or its components as described herein. For example, the operations of the method 1400 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1405, the method may include transmitting a set of reference signals to a UE, the set of reference signals including a power amplifier uncompressed reference signal and a subset of compressed reference signals that are compressed with respective levels of power amplifier compression. The operations of 1405 may be performed in accordance with examples as disclosed herein. In some examples, aspects of the operations of 1405 may be performed by a reference manager 725 as described with reference to FIG. 7.

At 1410, the method may include receiving a channel state report from the UE including channel state feedback associated with the power amplifier uncompressed reference signal and each reference signal of the subset of compressed reference signals. The operations of 1410 may be performed in accordance with examples as disclosed herein. In some examples, aspects of the operations of 1410 may be performed by a channel manager 730 as described with reference to FIG. 7.

At 1415, the method may include comparing channel state feedback of at least one reference signal of the subset of compressed reference signals to channel state feedback of the power amplifier uncompressed reference signal. The operations of 1415 may be performed in accordance with examples as disclosed herein. In some examples, aspects of the operations of 1415 may be performed by an analysis manager 745 as described with reference to FIG. 7.

At 1420, the method may include determining, based at least in part on a result of the comparing, a highest level of power amplifier compression that the UE is capable of processing of the respective levels of power amplifier compression. The operations of 1420 may be performed in accordance with examples as disclosed herein. In some examples, aspects of the operations of 1420 may be performed by an analysis manager 745 as described with reference to FIG. 7.

At 1425, the method may include selecting a power amplifier compression level for communications with the UE based at least in part on the channel state report. The operations of 1425 may be performed in accordance with examples as disclosed herein. In some examples, aspects of the operations of 1425 may be performed by a compression manager 735 as described with reference to FIG. 7.

At 1430, the method may include communicating with the UE according to the selected power amplifier compression level. The operations of 1430 may be performed in accordance with examples as disclosed herein. In some examples, aspects of the operations of 1430 may be performed by a connection manager 740 as described with reference to FIG. 7.

FIG. 15 shows a flowchart illustrating a method 1500 that supports power amplifier compressed reference signals for digital post distortion detection in accordance with aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a set of reference signals including a power amplifier uncompressed reference signal and a subset of compressed reference signals that are compressed with respective levels of power amplifier compression. The operations of 1505 may be performed in accordance with examples as disclosed herein. In some examples, aspects of the operations of 1505 may be performed by a signal manager 1125 as described with reference to FIG. 11.

At 1510, the method may include performing a channel state measurement on each reference signal of the set of reference signals. The operations of 1510 may be performed in accordance with examples as disclosed herein. In some examples, aspects of the operations of 1510 may be performed by a state manager 1130 as described with reference to FIG. 11.

At 1515, the method may include transmitting, to the base station based at least in part on the channel state measurement performed on each reference signal, a channel state report including channel state feedback associated with each reference signal of the subset of compressed reference signals and the power amplifier uncompressed reference signal. The operations of 1515 may be performed in accordance with examples as disclosed herein. In some examples, aspects of the operations of 1515 may be performed by a report manager 1135 as described with reference to FIG. 11.

At 1520, the method may include communicating with the base station based at least in part on a power amplifier compression level that is implemented in accordance with the channel state report. The operations of 1520 may be performed in accordance with examples as disclosed herein. In some examples, aspects of the operations of 1520 may be performed by a link manager 1140 as described with reference to FIG. 11.

FIG. 16 shows a flowchart illustrating a method 1600 that supports power amplifier compressed reference signals for digital post distortion detection in accordance with aspects of the present disclosure. The operations of the method 1600 may be implemented by a UE or its components as described herein. For example, the operations of the method 1600 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a set of reference signals including a power amplifier uncompressed reference signal and a subset of compressed reference signals that are compressed with respective levels of power amplifier compression. The operations of 1605 may be performed in accordance with examples as disclosed herein. In some examples, aspects of the operations of 1605 may be performed by a signal manager 1125 as described with reference to FIG. 11.

At 1610, the method may include performing a channel state measurement on each reference signal of the set of reference signals. The operations of 1610 may be performed in accordance with examples as disclosed herein. In some examples, aspects of the operations of 1610 may be performed by a state manager 1130 as described with reference to FIG. 11.

At 1615, the method may include transmitting, to the base station based at least in part on the channel state measurement performed on each reference signal, a channel state report including channel state feedback associated with each reference signal of the subset of compressed reference signals and the power amplifier uncompressed reference signal. The operations of 1615 may be performed in accordance with examples as disclosed herein. In some examples, aspects of the operations of 1615 may be performed by a report manager 1135 as described with reference to FIG. 11.

At 1620, the method may include receiving a signal from the base station that is compressed with the power amplifier compression level that is implemented in accordance with the channel state report. The operations of 1620 may be performed in accordance with examples as disclosed herein. In some examples, aspects of the operations of 1620 may be performed by a distortion manager 1150 as described with reference to FIG. 11.

At 1625, the method may include applying digital post distortion reduction to the received signal based at least in part on a digital post distortion model supported by the UE. The operations of 1625 may be performed in accordance with examples as disclosed herein. In some examples, aspects of the operations of 1625 may be performed by a distortion manager 1150 as described with reference to FIG. 11.

At 1630, the method may include communicating with the base station based at least in part on a power amplifier compression level that is implemented in accordance with the channel state report. The operations of 1630 may be performed in accordance with examples as disclosed herein. In some examples, aspects of the operations of 1630 may be performed by a link manager 1140 as described with reference to FIG. 11.

The following provides an overview of aspects of the present disclosure:

Aspect 1: A method for wireless communication at a base station, comprising: transmitting a set of reference signals to a UE, the set of reference signals comprising a power amplifier uncompressed reference signal and a subset of compressed reference signals that are compressed with respective levels of power amplifier compression; receiving a channel state report from the UE comprising channel state feedback associated with the power amplifier uncompressed reference signal and each reference signal of the subset of compressed reference signals; selecting a power amplifier compression level for communications with the UE based at least in part on the channel state report; and communicating with the UE according to the selected power amplifier compression level.

Aspect 2: The method of aspect 1, further comprising: comparing channel state feedback of at least one reference signal of the subset of compressed reference signals to channel state feedback of the power amplifier uncompressed reference signal; and determining, based at least in part on a result of the comparing, a highest level of power amplifier compression that the UE is capable of processing of the respective levels of power amplifier compression.

Aspect 3: The method of aspect 2, wherein determining the highest level of power amplifier compression that the UE is capable of processing comprises: determining that the UE is capable of processing channel state feedback of a first reference signal of the subset of compressed reference signals associated with a first level of power amplifier compression; determining that the UE is not capable of processing channel state feedback of a second reference signal of the subset of compressed reference signals associated with a second level of power amplifier compression; and selecting the first level of power amplifier compression as the highest level of power amplifier compression that the UE is capable of processing of the respective levels of power amplifier compression.

Aspect 4: The method of aspect 3, wherein the second level of power amplifier compression is a next highest level of power amplifier compression above the first level of power amplifier compression of the respective levels of power amplifier compression.

Aspect 5: The method of any of aspects 2 through 4, wherein the highest level of power amplifier compression that the UE is capable of processing is based at least in part on a coefficient of a digital post distortion model supported by the UE.

Aspect 6: The method of any of aspects 1 through 5, wherein the selected power amplifier compression level is selected from the respective levels of power amplifier compression of the subset of compressed reference signals.

Aspect 7: The method of any of aspects 1 through 6, wherein the channel state feedback comprises a pre-coding matrix indicator, a channel quality indicator, or a rank indicator, or any combination thereof.

Aspect 8: The method of any of aspects 1 through 7, wherein the set of reference signals include channel state information reference signals.

Aspect 9: The method of any of aspects 1 through 8, wherein the set of reference signals to are transmitted periodically or aperiodically.

Aspect 10: The method of any of aspects 1 through 9, wherein the power amplifier uncompressed reference signal is transmitted by a transmitter of the base station while a power amplifier of the transmitter is operating in a linear region.

Aspect 11: The method of any of aspects 1 through 10, wherein the subset of compressed reference signals is transmitted by a transmitter of the base station while a power amplifier of the transmitter is operating in a compression region.

Aspect 12: A method for wireless communication at a UE, further comprising: receiving, from a base station, a set of reference signals comprising a power amplifier uncompressed reference signal and a subset of compressed reference signals that are compressed with respective levels of power amplifier compression; performing a channel state measurement on each reference signal of the set of reference signals; transmitting, to the base station based at least in part on the channel state measurement performed on each reference signal, a channel state report comprising channel state feedback associated with each reference signal of the subset of compressed reference signals and the power amplifier uncompressed reference signal; and communicating with the base station based at least in part on a power amplifier compression level that is implemented in accordance with the channel state report.

Aspect 13: The method of aspect 12, wherein performing the channel state measurement on each reference signal of the set of reference signals comprises: estimating the channel state feedback of each reference signal of the set of reference signals, the channel state feedback including a pre-coding matrix indicator, a channel quality indicator, a rank indicator, or a modulation and coding scheme value, or any combination thereof.

Aspect 14: The method of any of aspects 12 through 13, wherein communicating with the base station comprises: receiving a signal from the base station that is compressed with the power amplifier compression level that is implemented in accordance with the channel state report; and applying digital post distortion reduction to the received signal based at least in part on a digital post distortion model supported by the UE.

Aspect 15: The method of aspect 14, wherein applying digital post distortion reduction is based at least in part on coefficients of the digital post distortion model that are supported by the UE.

Aspect 16: The method of aspect 15, wherein the power amplifier compression level that is implemented in accordance with the channel state report is based at least in part on the coefficients of the digital post distortion model, the coefficients including one or more weights of a Volterra filter.

Aspect 17: The method of any of aspects 12 through 16, wherein the set of reference signals are received periodically or aperiodically.

Aspect 18: The method of any of aspects 12 through 17, wherein transmission of the power amplifier uncompressed reference signal is based at least in part on a power amplifier of the base station operating in a linear region.

Aspect 19: The method of any of aspects 12 through 18, wherein transmission of the subset of compressed reference signals is based at least in part on a power amplifier of the base station operating in a compression region.

Aspect 20: An apparatus for wireless communication at a base station, comprising a processor: memory coupled with the processor; and instructions stored in the memory and executable by the processor to cause the apparatus to perform a method of any of aspects 1 through 11.

Aspect 21: An apparatus for wireless communication at a base station, comprising at least one means for performing a method of any of aspects 1 through 11.

Aspect 22: A non-transitory computer-readable medium storing code for wireless communication at a base station, the code comprising instructions executable by a processor to perform a method of any of aspects 1 through 11.

Aspect 23: An apparatus for wireless communication at a UE, comprising a processor; memory coupled with the processor; and instructions stored in the memory and executable by the processor to cause the apparatus to perform a method of any of aspects 12 through 19.

Aspect 24: An apparatus for wireless communication at a UE, comprising at least one means for performing a method of any of aspects 12 through 19.

Aspect 25: A non-transitory computer-readable medium storing code for wireless communication at a UE, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a base station, comprising:

transmitting a set of reference signals to a user equipment (UE), the set of reference signals comprising a power amplifier uncompressed reference signal and a subset of compressed reference signals that are compressed with respective levels of power amplifier compression;

receiving a channel state report from the UE comprising channel state feedback associated with the power amplifier uncompressed reference signal and each reference signal of the subset of compressed reference signals;

selecting a power amplifier compression level for communications with the UE based at least in part on the channel state report; and communicating with the UE according to the selected power amplifier compression level.

2. The method of claim 1, further comprising:

comparing channel state feedback of at least one reference signal of the subset of compressed reference signals to channel state feedback of the power amplifier uncompressed reference signal; and determining, based at least in part on a result of the comparing, a highest level of power amplifier compression that the UE is capable of processing of the respective levels of power amplifier compression.

3. The method of claim 2, wherein determining the highest level of power amplifier compression that the UE is capable of processing comprises:

determining that the UE is capable of processing channel state feedback of a first reference signal of the subset of compressed reference signals associated with a first level of power amplifier compression;

determining that the UE is not capable of processing channel state feedback of a second reference signal of the subset of compressed reference signals associated with a second level of power amplifier compression; and selecting the first level of power amplifier compression as the highest level of power amplifier compression that the UE is capable of processing of the respective levels of power amplifier compression.

4. The method of claim 3, wherein the second level of power amplifier compression is a next highest level of power amplifier compression above the first level of power amplifier compression of the respective levels of power amplifier compression.

5. The method of claim 2, wherein the highest level of power amplifier compression that the UE is capable of processing is based at least in part on a coefficient of a digital post distortion model supported by the UE.

6. The method of claim 1, wherein the selected power amplifier compression level is selected from the respective levels of power amplifier compression of the subset of compressed reference signals.

7. The method of claim 1, wherein the channel state feedback comprises a pre-coding matrix indicator, a channel quality indicator, or a rank indicator, or any combination thereof.

8. The method of claim 1, wherein the set of reference signals include channel state information reference signals.

9. The method of claim 1, wherein the set of reference signals are transmitted periodically or aperiodically.

10. The method of claim 1, wherein the power amplifier uncompressed reference signal is transmitted by a transmitter of the base station while a power amplifier of the transmitter is operating in a linear region.

11. The method of claim 1, wherein the subset of compressed reference signals is transmitted by a transmitter of the base station while a power amplifier of the transmitter is operating in a compression region.

12. A method for wireless communication at a user equipment (UE), comprising:

receiving, from a base station, a set of reference signals comprising a power amplifier uncompressed reference signal and a subset of compressed reference signals that are compressed with respective levels of power amplifier compression;

performing a channel state measurement on each reference signal of the set of reference signals;

transmitting, to the base station based at least in part on the channel state measurement performed on each reference signal, a channel state report comprising channel state feedback associated with each reference signal of the subset of compressed reference signals and the power amplifier uncompressed reference signal; and communicating with the base station based at least in part on a power amplifier compression level that is implemented in accordance with the channel state report.

13. The method of claim 12, wherein performing the channel state measurement on each reference signal of the set of reference signals comprises:

estimating the channel state feedback of each reference signal of the set of reference signals, the channel state feedback including a pre-coding matrix indicator, a channel quality indicator, a rank indicator, or a modulation and coding scheme value, or any combination thereof.

14. The method of claim 12, wherein communicating with the base station comprises:

receiving a signal from the base station that is compressed with the power amplifier compression level that is implemented in accordance with the channel state report; and applying digital post distortion reduction to the received signal based at least in part on a digital post distortion model supported by the UE.

15. The method of claim 14, wherein applying digital post distortion reduction is based at least in part on coefficients of the digital post distortion model that are supported by the UE.

16. The method of claim 15, wherein the power amplifier compression level that is implemented in accordance with the channel state report is based at least in part on the coefficients of the digital post distortion model, the coefficients including one or more weights of a Volterra filter.

17. The method of claim 12, wherein the set of reference signals are received periodically or aperiodically.

18. The method of claim 12, wherein transmission of the power amplifier uncompressed reference signal is based at least in part on a power amplifier of the base station operating in a linear region.

19. The method of claim 12, wherein transmission of the subset of compressed reference signals is based at least in part on a power amplifier of the base station operating in a compression region.

20. An apparatus for wireless communication at a base station, comprising:

a processor;

a memory coupled with the processor, wherein the memory comprises instructions executable by the processor to cause the apparatus to:

transmit a set of reference signals to a user equipment (UE), the set of reference signals comprising a power amplifier uncompressed reference signal and a subset of compressed reference signals that are compressed with respective levels of power amplifier compression;

receive a channel state report from the UE comprising channel state feedback associated with the power amplifier uncompressed reference signal and each reference signal of the subset of compressed reference signals;

select a power amplifier compression level for communications with the UE based at least in part on the channel state report; and communicate with the UE according to the selected power amplifier compression level.

21. The apparatus of claim 20, wherein the instructions are further executable by the processor to cause the apparatus to:

compare channel state feedback of at least one reference signal of the subset of compressed reference signals to channel state feedback of the power amplifier uncompressed reference signal; and determine, based at least in part on a result of the comparing, a highest level of power amplifier compression that the UE is capable of processing of the respective levels of power amplifier compression.

22. The apparatus of claim 21, wherein the instructions to determine the highest level of power amplifier compression that the UE is capable of processing are executable by the processor to cause the apparatus to:

determine that the UE is capable of processing channel state feedback of a first reference signal of the subset of compressed reference signals associated with a first level of power amplifier compression;

determine that the UE is not capable of processing channel state feedback of a second reference signal of the subset of compressed reference signals associated with a second level of power amplifier compression; and select the first level of power amplifier compression as the highest level of power amplifier compression that the UE is capable of processing of the respective levels of power amplifier compression.

23. The apparatus of claim 22, wherein the second level of power amplifier compression is a next highest level of power amplifier compression above the first level of power amplifier compression of the respective levels of power amplifier compression.

24. The apparatus of claim 21, wherein the highest level of power amplifier compression that the UE is capable of processing is based at least in part on a coefficient of a digital post distortion model supported by the UE.

25. The apparatus of claim 20, wherein the selected power amplifier compression level is selected from the respective levels of power amplifier compression of the subset of compressed reference signals.

26. The apparatus of claim 20, wherein the channel state feedback comprises a pre-coding matrix indicator, a channel quality indicator, or a rank indicator, or any combination thereof.

27. The apparatus of claim 20, wherein: the set of reference signals includes channel state information reference signals.

28. The apparatus of claim 20, wherein: the set of reference signals are transmitted periodically or aperiodically.

29. The apparatus of claim 20, wherein the power amplifier uncompressed reference signal is transmitted by a transmitter of the base station while a power amplifier of the transmitter is operating in a linear region.

30. An apparatus for wireless communication at a user equipment (UE), comprising:

a processor;

a memory coupled with the processor, wherein the memory comprises instructions executable by the processor to cause the apparatus to:

receive, from a base station, a set of reference signals comprising a power amplifier uncompressed reference signal and a subset of compressed reference signals that are compressed with respective levels of power amplifier compression;

perform a channel state measurement on each reference signal of the set of reference signals;

transmit, to the base station based at least in part on the channel state measurement performed on each reference signal, a channel state report comprising channel state feedback associated with each reference signal of the subset of compressed reference signals and the power amplifier uncompressed reference signal; and communicate with the base station based at least in part on a power amplifier compression level that is implemented in accordance with the channel state report.

* * * * *